US012759369B2

(12) United States Patent
Miyake et al.

(10) Patent No.: US 12,759,369 B2
(45) Date of Patent: Oct. 13, 2026

(54) VEHICLE TEMPERATURE CONTROL SYSTEM

(71) Applicant: TOYODA GOSEI CO., LTD., Kiyosu (JP)

(72) Inventors: Kazutoshi Miyake, Aichi (JP); Kenichiro Kaneko, Aichi (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 123 days.

(21) Appl. No.: 18/772,489

(22) Filed: Jul. 15, 2024

(65) Prior Publication Data

US 2025/0026169 A1 Jan. 23, 2025

(30) Foreign Application Priority Data

Jul. 18, 2023 (JP) ................................ 2023-116661

(51) Int. Cl.
*B60H 1/00* (2006.01)
*B60H 1/22* (2006.01)

(52) U.S. Cl.
CPC ..... *B60H 1/00278* (2013.01); *B60H 1/00885* (2013.01); *B60H 1/22* (2013.01); *B60H 2001/00307* (2013.01)

(58) Field of Classification Search
CPC .. B60H 1/00278; B60H 1/00885; B60H 1/22; B60H 2001/00307; B60H 1/32284; B60H 1/00271; B60H 1/00385; B60H 1/3227; Y02E 60/10; B60L 58/26; B60L 58/27
USPC ......................................................... 165/202
See application file for complete search history.

(56) References Cited

U.S. PATENT DOCUMENTS

| | | | | |
|---|---|---|---|---|
| 11,456,495 | B2 * | 9/2022 | Brinkmann | H01M 10/625 |
| 11,884,132 | B2 * | 1/2024 | Hair | B60L 1/003 |
| 11,890,913 | B2 * | 2/2024 | Rotenburg | B60N 2/56 |
| 12,214,644 | B2 * | 2/2025 | Heyl | B60H 1/00021 |
| 2013/0111932 | A1 * | 5/2013 | Mishima | B60L 58/27 62/159 |
| 2014/0208789 | A1 * | 7/2014 | Lombardo | F25B 6/02 62/238.1 |
| 2018/0178615 | A1 * | 6/2018 | Xia | H01M 10/486 |
| 2019/0061470 | A1 * | 2/2019 | Koberstein | B60H 1/00392 |
| 2019/0275858 | A1 * | 9/2019 | Seki | B60H 1/00907 |

(Continued)

FOREIGN PATENT DOCUMENTS

| | | | | |
|---|---|---|---|---|
| EP | 4223566 A1 * | 8/2023 | | B60K 11/02 |
| JP | 2014-058241 A | 4/2014 | | |

(Continued)

*Primary Examiner* — Jenna M Maroney
*Assistant Examiner* — Gustavo A Hincapie Serna
(74) *Attorney, Agent, or Firm* — Posz Law Group, PLC

(57) ABSTRACT

A vehicle temperature control system includes: a reserve tank; a cooling circuit; a heater circuit; a temperature control circuit including (i) a heating flow path connected to the heater circuit and configured to allow a heated temperature control liquid to flow from the reserve tank to a battery, (ii) a cooling flow path configured to allow a cooled temperature control liquid to flow from the reserve tank toward the battery and a charging unit and (iii) a recovery flow path configured to allow the temperature control liquid to flow from the heating flow path and the cooling flow path toward the reserve tank; and a first valve configured to open and close the heating flow path.

12 Claims, 16 Drawing Sheets

(56) References Cited

U.S. PATENT DOCUMENTS

| | | | | |
|---|---|---|---|---|
| 2020/0361280 | A1* | 11/2020 | Hashimoto | B60H 1/00885 |
| 2021/0188043 | A1* | 6/2021 | Smith | B60H 1/3204 |
| 2021/0316594 | A1* | 10/2021 | Kawano | B60H 1/00278 |
| 2022/0176774 | A1* | 6/2022 | Tang | B60H 1/00278 |
| 2022/0302519 | A1* | 9/2022 | Tsuruta | H01M 10/635 |
| 2023/0191870 | A1* | 6/2023 | Zhao | B60H 1/00278 165/42 |
| 2023/0226877 | A1* | 7/2023 | Hu | B60L 1/003 62/79 |
| 2023/0406059 | A1* | 12/2023 | Dai | B60H 1/00278 |
| 2024/0034129 | A1* | 2/2024 | Kim | B60H 1/00485 |
| 2024/0166089 | A1* | 5/2024 | Tsuda | H01M 10/613 |
| 2024/0227541 | A9* | 7/2024 | Suzuki | B60K 11/04 |
| 2024/0239157 | A1* | 7/2024 | Michikawauchi | B60H 1/3228 |
| 2024/0300301 | A1* | 9/2024 | Suzuki | B60H 1/00392 |
| 2024/0391356 | A1* | 11/2024 | Doke | B60L 58/26 |
| 2025/0065689 | A1* | 2/2025 | Zhang | B60L 58/26 |
| 2025/0075957 | A1* | 3/2025 | Whiteman | B60K 25/00 |
| 2025/0220865 | A1* | 7/2025 | Ishii | B60K 11/02 |
| 2026/0116259 | A1* | 4/2026 | Wu | B60L 58/26 |

FOREIGN PATENT DOCUMENTS

| | | | | |
|---|---|---|---|---|
| JP | 2020185829 A | * 11/2020 | | B60L 58/27 |
| KR | 20220167412 A | * 12/2022 | | B60H 1/323 |

* cited by examiner

FIG. 2

| CONTROL MODE | VEHICLE INTERIOR AIR CONDITIONING | COOLING OF OBJECT TO BE COOLED | BATTERY TEMPERATURE CONTROL | COOLING OF CHARGING UNIT | FIRST VALVE | SECOND VALVE | THIRD VALVE | FOURTH VALVE | HEATER | CHILLER |
|---|---|---|---|---|---|---|---|---|---|---|
| Md1 | HEATING | NOT NECESSARY | HEATING | NOT NECESSARY | ALLOW f1, f2 | REGULATE f3, f4 | REGULATE f5, f6 | REGULATE f7, f8 | ON | OFF |
| Md2 | HEATING | NECESSARY | NOT NECESSARY | NOT NECESSARY | ALLOW f2 ONLY | REGULATE f3, f4 | ALLOW f6 ONLY | REGULATE f7, f8 | ON | OFF |
| Md3 | HEATING | NECESSARY | COOLING | NOT NECESSARY | ALLOW f2 ONLY | ALLOW f4 ONLY | ALLOW f5, f6 | REGULATE f7, f8 | ON | OFF |
| Md4 | HEATING | NOT NECESSARY | COOLING (INTENSE) | NECESSARY | ALLOW f2 ONLY | ALLOW f4 ONLY | ALLOW f5 ONLY | ALLOW f7 ONLY | ON | ON |
| Md5 | NOT NECESSARY | NOT NECESSARY | NOT NECESSARY | NOT NECESSARY | REGULATE f1, f2 | REGULATE f3, f4 | REGULATE f5, f6 | REGULATE f7, f8 | OFF | OFF |
| Md6 | NOT NECESSARY | NECESSARY | NOT NECESSARY | NOT NECESSARY | REGULATE f1, f2 | REGULATE f3, f4 | ALLOW f6 ONLY | REGULATE f7, f8 | OFF | OFF |
| Md7 | NOT NECESSARY | NECESSARY | COOLING | NOT NECESSARY | REGULATE f1, f2 | ALLOW f4 ONLY | ALLOW f5, f6 | REGULATE f7, f8 | OFF | OFF |
| Md8 | NOT NECESSARY | NOT NECESSARY | COOLING (INTENSE) | NECESSARY | REGULATE f1, f2 | ALLOW f4 ONLY | ALLOW f5 ONLY | ALLOW f7 ONLY | OFF | ON |

(CONT.)

(FIG. 2 CONTINUED)

| MODE SELECTION CONDITION | | | | CONTROL DETAILS | | | | | | |
|---|---|---|---|---|---|---|---|---|---|---|
| Md9 | COOLING | NOT NECESSARY | NOT NECESSARY | NOT NECESSARY | REGULATE f1, f2 | REGULATE f3, f4 | REGULATE f5, f6 | ALLOW f8 ONLY | OFF | ON |
| Md10 | COOLING | NECESSARY | NOT NECESSARY | NOT NECESSARY | REGULATE f1, f2 | REGULATE f3, f4 | ALLOW f6 ONLY | ALLOW f8 ONLY | OFF | ON |
| Md11 | COOLING | NECESSARY | COOLING | NOT NECESSARY | REGULATE f1, f2 | ALLOW f4 ONLY | ALLOW f5, f6 | ALLOW f8 ONLY | OFF | ON |
| Md12 | COOLING | NOT NECESSARY | COOLING (INTENSE) | NECESSARY | REGULATE f1, f2 | ALLOW f4 ONLY | ALLOW f5 ONLY | ALLOW f7, f8 | OFF | ON |

VEHICLE TEMPERATURE CONTROL SYSTEM

CROSS-REFERENCE TO RELATED APPLICATIONS

This application is based on and claims priority under 35 USC 119 from Japanese Patent Application No. 2023-116661 filed on Jul. 18, 2023, the entire content of which is incorporated herein by reference.

TECHNICAL FIELD

The present disclosure relates to a vehicle temperature control system.

BACKGROUND ART

Regarding temperature control system for an electric vehicle, JP2014-58241A discloses a battery temperature control system for an electric vehicle. In the temperature control system, a liquid is circulated between a reserve tank storing the liquid and an inverter or a battery, thereby cooling the inverter, and cooling and preheating the battery.

SUMMARY OF INVENTION

In order to appropriately use an electric vehicle in a cold environment, there is a demand for a temperature control system capable of effectively heating an object to be heated or a battery mounted on the vehicle while cooling an object to be cooled or a battery mounted on the vehicle.

The present disclosure can be implemented by the following aspects.

(1) According to the first aspect of the present disclosure, there is provided a vehicle temperature control system used in an electric vehicle, the vehicle temperature control system including: a reserve tank configured to store a temperature control liquid; a cooling circuit configured to circulate the temperature control liquid in an order of the reserve tank, a first cooling unit configured to cool the temperature control liquid, and an object to be cooled provided in the electric vehicle; a heater circuit configured to circulate the temperature control liquid in an order of the reserve tank, a heater configured to heat the temperature control liquid, and an object to be heated provided in the electric vehicle; a temperature control circuit including (i) a heating flow path connected to the heater circuit and configured to allow the temperature control liquid heated by the heater to flow from the reserve tank to a battery for driving provided in the electric vehicle, (ii) a cooling flow path configured to allow the cooled temperature control liquid to flow from the reserve tank toward the battery and a charging unit configured to charge the battery, and (iii) a recovery flow path configured to allow the temperature control liquid to flow from the heating flow path and the cooling flow path toward the reserve tank; and a first valve configured to open and close the heating flow path.

According to such an aspect, the temperature control liquid in both the cooling circuit and the temperature control circuit that has cooled the object to be cooled, the battery, or the charging unit is recovered to the reserve tank, so that the temperature of the temperature control liquid in the reserve tank may be increased by using waste heat in the vehicle temperature control system. The temperature control liquid may be used for heating the object to be heated in the heater circuit or heating the battery in the heating flow path connected to the heater circuit. Therefore, the battery and the object to be heated may be effectively heated in the vehicle temperature control system.

(2) In the vehicle temperature control system according to the above aspect, the cooling flow path may branch at a branch point into a first cooling flow path configured to allow the temperature control liquid to flow toward the battery and a second cooling flow path configured to allow the temperature control liquid to flow toward the charging unit, and a second valve configured to open and close the second cooling flow path may further be provided.

According to such an aspect, by opening and closing the second cooling flow path using the second valve, it is possible to switch between a state in which the temperature control liquid in the cooling flow path flows to the charging unit and a state in which the temperature control liquid does not flow to the charging unit. Therefore, for example, the battery may be more effectively cooled by closing the second cooling flow path in a case where cooling of the battery while cooling of the charging unit is not necessary.

(3) The vehicle temperature control system according to the above aspect may further include a third valve provided at a connection point between the cooling circuit and the cooling flow path, and configured to open and close the cooling circuit and the cooling flow path, and the cooling flow path may be connected to a first portion of the cooling circuit, the first portion being located downstream of the first cooling unit and upstream of the object to be cooled.

According to such an aspect, the battery and the charging unit may be cooled using the temperature control liquid cooled in the cooling circuit.

(4) In the vehicle temperature control system according to the above aspect, the cooling flow path may pass through a second cooling unit configured to cool the temperature control liquid flowing through a second portion of the cooling flow path, the second portion being located upstream of the battery and the charging unit.

According to such an aspect, the battery may be cooled by using the temperature control liquid cooled by the second cooling unit in the cooling flow path.

(5) In the vehicle temperature control system according to the above aspect, the second cooling unit may include a radiator and a chiller configured to cool the temperature control liquid.

According to such an aspect, the battery may be cooled more effectively in the cooling flow path.

(6) In the vehicle temperature control system according to the above aspect, the chiller may be configured to supply heat of the temperature control liquid to the heater circuit.

According to such an aspect, the temperature control liquid may be cooled by the chiller in the cooling flow path, and the heat of the temperature control liquid may be supplied to the heater circuit. Therefore, waste heat may be effectively used in the vehicle temperature control system.

(7) In the vehicle temperature control system according to the above aspect, the cooling flow path may be provided with a first adjustment valve configured to adjust a flow rate of the cooled temperature control liquid flowing through the cooling flow path from the reserve tank toward the battery, the heating flow path may be provided with a second adjustment valve configured to adjust a flow rate of the temperature control liquid flowing through the heating flow path from the heater circuit toward the battery, the vehicle temperature control system may further include a temperature sensor configured to measure a temperature of the battery and a control unit configured to control the first adjustment valve and the second adjustment valve, and the control unit may control the first adjustment valve and the second adjustment valve according to a measurement value of the temperature sensor.

According to such an aspect, the flow rate of the temperature control liquid flowing through the cooling flow path toward the battery and the flow rate of the temperature control liquid flowing through the heating flow path toward the battery may be adjusted according to the temperature of the battery. Therefore, the temperature of the battery may be controlled more finely.

(8) In the vehicle temperature control system according to the above aspect, the object to be cooled may include at least one of a motor and an inverter that are supplied with electric power from the battery and are used to drive the electric vehicle, and the object to be heated may include a heater core used to heat a vehicle interior of the electric vehicle.

According to such an aspect, the motor and the inverter may be cooled by the cooling circuit, and the heater core for heating the vehicle interior may be heated by the heater circuit.

In addition to the vehicle temperature control system described above, the present disclosure may be implemented in various forms such as a control method for a vehicle temperature control system and an electric vehicle equipped with a vehicle temperature control system.

BRIEF DESCRIPTION OF DRAWINGS

Exemplary embodiment(s) of the present invention will be described in detail based on the following figures, wherein:

FIG. 2 is a diagram illustrating examples of control modes of the temperature control system;

DESCRIPTION OF EMBODIMENTS

A. First Embodiment

Figure 1:
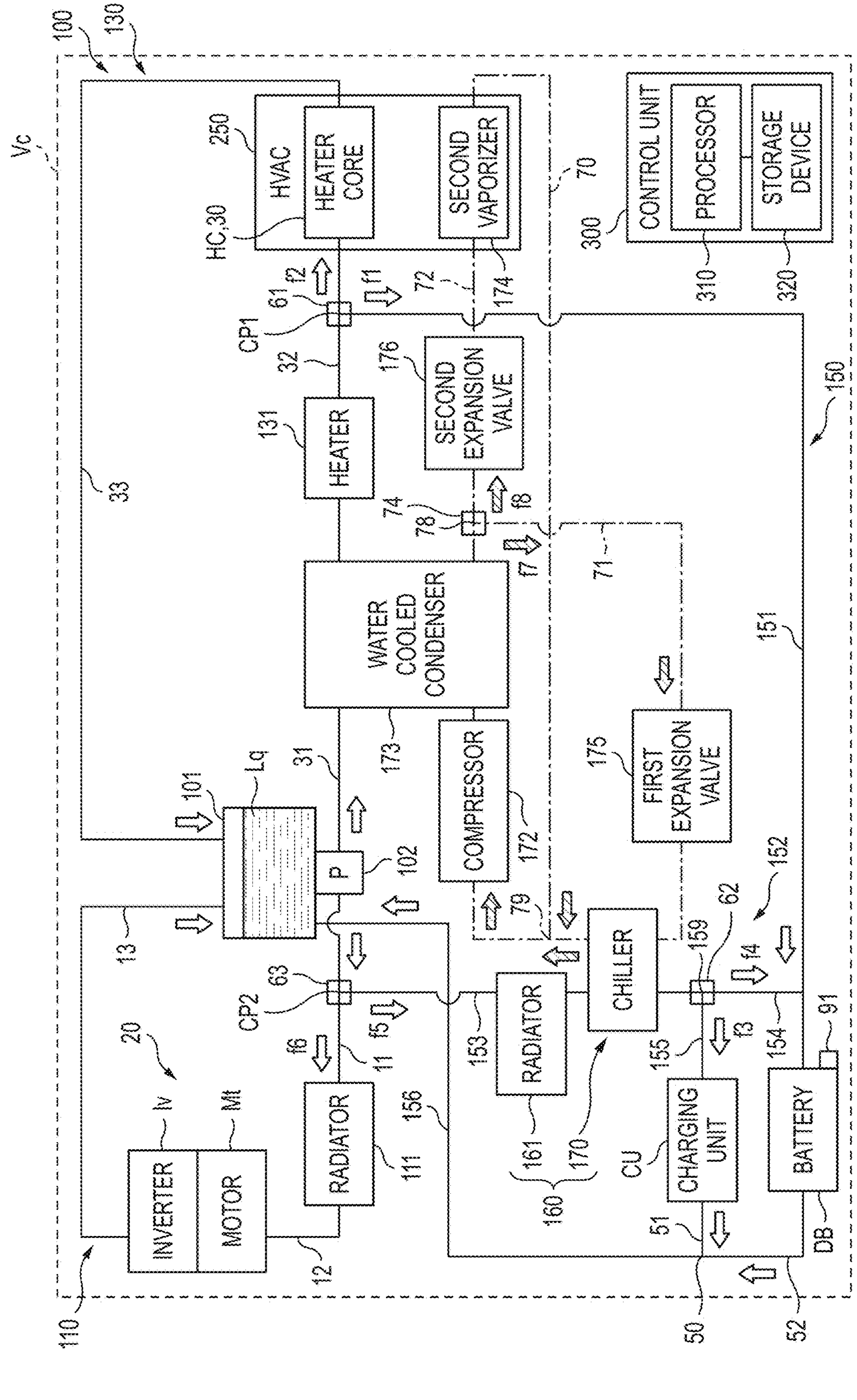
FIG. 1 is a diagram illustrating a schematic configuration of a temperature control system according to a first embodiment.

FIG. 1 is a diagram illustrating a schematic configuration of a temperature control system 100 according to a first embodiment. The temperature control system 100 is a vehicle temperature control system, and is provided in an electric vehicle Vc. The temperature control system 100 adjusts the temperature of each part of the electric vehicle Vc using a temperature control liquid Lq. The temperature control liquid Lq is a liquid used to adjust the temperature of each part of the electric vehicle Vc in the temperature control system 100. As the temperature control liquid Lq, for example, water may be used, or a long life coolant (LLC) containing ethylene glycol, propylene glycol, or the like as a main component may be used.

In the present embodiment, the electric vehicle Vc is configured as a battery electric vehicle (BEV), and includes a battery DB, a motor Mt, and an inverter Iv, each used to drive the electric vehicle Vc, and a charging unit CU for charging the battery DB. In another embodiment, the electric vehicle Vc may not be configured as a BEV as long as it includes the battery DB and the charging unit CU, and may be, for example, a plug-in hybrid electric vehicle (PHEV) or a fuel cell vehicle (FCV).

The battery DB is implemented by, for example, a lithium ion battery, and supplies driving electric power to the motor Mt and the inverter Iv. The battery DB may be implemented by, for example, a battery having an electrolyte containing a lithium salt, an organic solvent, or an additive as an electrolyte, or may be implemented by a so-called all-solid battery having a solid electrolyte. The temperature control system 100 according to the present embodiment is provided with a temperature sensor 91 that measures the temperature of the battery DB. A measurement value by the temperature sensor 91 is transmitted to a control unit 300. The charging unit CU is implemented by a converter that converts an AC voltage supplied from an external power source (for example, a commercial power source) into a DC voltage, or a DC/DC converter that is electrically connected to said converter.

The temperature control system 100 includes a reserve tank 101 that stores the temperature control liquid Lq, a cooling circuit 110 used for cooling an object to be cooled 20, a heater circuit 130 used for heating an object to be heated 30, a temperature control circuit 150 used to cool and heat the battery DB and to cool the charging unit CU, and the control unit 300. The temperature control liquid Lq flows through each circuit. In FIG. 1, a flow direction of the temperature control liquid Lq in each circuit is appropriately indicated by white arrows. A pump 102 for supplying the temperature control liquid Lq to each of the above-described circuits is fixed to the reserve tank 101 in the present embodiment. In the present embodiment, the reserve tank 101 and the pump 102 are commonly used for each circuit in order to circulate the temperature control liquid Lq in the cooling circuit 110, the heater circuit 130, and the temperature control circuit 150. Hereinafter, objects to be heated or cooled by the temperature control liquid Lq in the temperature control system 100, such as the object to be cooled 20, the object to be heated 30, the battery DB, and the charging unit CU, are also referred to as a temperature control object without being distinguished. In another embodiment, the pump 102 may not be fixed to the reserve tank 101.

In the present embodiment, the object to be cooled 20 is the motor Mt and the inverter Iv described above. The object to be heated 30 is a heater core HC used for heating a vehicle interior of the electric vehicle Vc. The heater core HC constitutes a part of a heating, ventilation, and air conditioning (HVAC) system 250 of the electric vehicle Vc.

The cooling circuit 110 is configured to circulate the temperature control liquid Lq in the order of the reserve tank 101, a first cooling unit 111 that cools the temperature control liquid Lq, and the object to be cooled 20. The cooling circuit 110 includes a first flow path 11 providing connection between the reserve tank 101 and the first cooling unit 111, a second flow path 12 providing connection between the first cooling unit 111 and the object to be cooled 20, and a third flow path 13 providing connection between the object to be cooled 20 and the reserve tank 101. In the present embodiment, the first flow path 11 is connected to the pump 102. In the cooling circuit 110, the second flow path 12 is located downstream of the first flow path 11, and the third flow path 13 is located downstream of the second flow path 12. Hereinafter, a portion of the cooling circuit 110 located downstream of the first cooling unit 111 and upstream of the object to be cooled 20 is also referred to as a first portion. In the present embodiment, the second flow path 12 corresponds to the first portion. Each of the flow paths included in the cooling circuit 110 and each of flow paths included in the heater circuit 130 and the temperature control circuit 150 to be described later is formed of, for example, a rubber hose pipe or a nylon tube pipe.

In the present embodiment, the first cooling unit 111 is implemented by a radiator. A cooling capacity of the first cooling unit 111 is controlled by, for example, controlling a rotation speed of a radiator fan under the control of the control unit 300. In another embodiment, the first cooling unit 111 may include, for example, a chiller in addition to or instead of the radiator.

The heater circuit 130 is configured to circulate the temperature control liquid Lq in the order of the reserve tank 101, a heater 131 that heats the temperature control liquid Lq, and the object to be heated 30. The heater circuit 130 includes a fourth flow path 31 providing connection between the reserve tank 101 and the heater 131, a fifth flow path 32 providing connection between the heater 131 and the object to be heated 30, and a sixth flow path 33 providing connection between the object to be heated 30 and the reserve tank 101. In the present embodiment, the fourth flow path 31 is connected to the pump 102. In the heater circuit 130, the fifth flow path 32 is located downstream of the fourth flow path 31, and the sixth flow path 33 is located downstream of the fifth flow path 32. The heater 131 is implemented by, for example, a heating wire heater or a positive temperature coefficient (PTC) heater, and is controlled by the control unit 300.

The temperature control circuit 150 includes a heating flow path 151, a cooling flow path 152, and a recovery flow path 156. The heating flow path 151 is a flow path for allowing the temperature control liquid Lq heated by the heater 131 to flow from the reserve tank 101 toward the battery DB. The heating flow path 151 is connected to the heater circuit 130. More specifically, the heating flow path 151 is connected to the fifth flow path 32. The cooling flow path 152 is a flow path for allowing the cooled temperature control liquid Lq to flow from the reserve tank 101 toward the battery DB and the charging unit CU. In the present embodiment, the cooling flow path 152 is connected to the first flow path 11. The recovery flow path 156 is a flow path for allowing the temperature control liquid Lq from the heating flow path 151 and the cooling flow path 152 to flow toward the reserve tank 101.

In the present embodiment, the cooling flow path 152 is formed as a flow path that branches at a branch point 159 into a common flow path 153, a first cooling flow path 154, and a second cooling flow path 155. The common flow path 153 is a flow path from the battery DB to the branch point 159. The first cooling flow path 154 is a flow path that extends from the branch point 159 and allows the temperature control liquid Lq to flow toward the battery DB. The second cooling flow path 155 is a flow path that extends from the branch point 159 and allows the temperature control liquid Lq to flow toward the charging unit CU. That is, the cooling flow path 152 branches into the first cooling flow path 154 and the second cooling flow path 155 at the branch point 159. In the recovery flow path 156, a flow path 51 extending from the charging unit CU toward the reserve tank 101 and a flow path 52 extending from the battery DB toward the reserve tank 101 are connected to each other at a merging point 50 where the flow path 51 and the flow path 52 are merged.

In the present embodiment, the cooling flow path 152 passes through a second cooling unit 160. The second cooling unit 160 cools the temperature control liquid Lq flowing through a second portion. The second portion is a portion of the cooling flow path 152 located upstream of the packing DB and the charging unit CU. More specifically, in the present embodiment, the common flow path 153 corresponds to the second portion, and the common flow path 153 passes through the second cooling unit 160. The second cooling unit 160 according to the present embodiment includes a radiator 161 and a chiller 170. In the present embodiment, the chiller 170 is configured to be able to cool a portion of the common flow path 153 downstream of the radiator 161. A cooling capacity of the second cooling unit 160 is controlled by controlling a rotation speed of a radiator fan of the radiator 161 and each part of the chiller 170 under the control of the control unit 300.

The temperature control system 100 according to the present embodiment is provided with a refrigerant circuit that includes the chiller 170, a compressor 172, a water-cooled condenser 173, a second vaporizer 174, a first expansion valve 175, and a second expansion valve 176, and is configured to circulate a refrigerant. In FIG. 1, a refrigerant flow path 70, which is a flow path of the refrigerant in the refrigerant circuit, is indicated by a dashed line, and a direction of the flow of the refrigerant in the refrigerant flow path 70 is indicated by hatched arrows. In the present embodiment, the refrigerant flow path 70 branches into a first refrigerant flow path 71 and a second refrigerant flow path 72 at a branch point 78. The first refrigerant flow path 71 and the second refrigerant flow path 72 merge together at a merging point 79.

The chiller 170 causes heat exchange between the refrigerant in the refrigerant flow path 70 and the temperature control liquid Lq flowing through the common flow path 153 downstream of the radiator 161. As a result of this heat exchange the temperature control liquid Lq flowing through the common flow path 153 is cooled. The compressor 172 compresses the refrigerant supplied from the chiller 170 and the second vaporizer 174, and delivers the refrigerant, which has been compressed to a high temperature and high pressure, to the water-cooled condenser 173. The compressor 172 is provided downstream of the merging point 79 described above. The water-cooled condenser 173 causes heat exchange between the temperature control liquid Lq flowing through the fourth flow path 31 of the heater circuit 130 and the refrigerant delivered from the compressor 172. Due to this heat exchange, the temperature control liquid Lq flowing through the fourth flow path 31 is heated, and the refrigerant in the refrigerant flow path 70 is cooled. That is, the chiller 170 according to the present embodiment is capable of supplying the heat of the temperature control liquid Lq to the heater circuit 130. The first expansion valve 175 and the chiller 170 are provided in a first refrigerant flow path 71. The first expansion valve 175 expands the refrigerant cooled by the water-cooled condenser 173, and supplies the refrigerant, which has been lowered in temperature and pressure due to the expansion, to the chiller 170. The second vaporizer 174 and the second expansion valve 176 are provided in the second cooling flow path 155. The second expansion valve 176 expands the refrigerant cooled by the water-cooled condenser 173, and supplies the refrigerant, which has been lowered in temperature and pressure due to the expansion, to the second vaporizer 174. The second vaporizer 174 constitutes a part of the HVAC system 250 described above, and is used for cooling the vehicle interior of the electric vehicle Vc.

The temperature control system 100 includes a first valve 61 and a second valve 62. Further, the temperature control system 100 according to the present embodiment includes a third valve 63 and a fourth valve 74. Each valve is implemented by, for example, an electrically operated switching valve. In this case, each valve may be configured to operate a valve body using an electric actuator, or may be configured to operate a valve body using a solenoid, for example. The operation of each valve is controlled by the control unit 300.

The first valve 61 is configured to open and close the heating flow path 151. In the present embodiment, the first valve 61 is provided at a connection point CP1 between the fifth flow path 32 and the heating flow path 151. The first valve 61 is configured to open and close the fifth flow path 32 in addition to the heating flow path 151. More specifically, the first valve 61 is configured to be able to switch between a state where both the heating flow path 151 and the fifth flow path 32 are opened, a state where only the heating flow path 151 is opened, a state where only the fifth flow path 32 is opened, and a state where both the heating flow path 151 and the fifth flow path 32 are closed. It can be said that the first valve 61 regulates and allows a flow f1 and a flow f2, separately. The flow f1 is a flow of the temperature control liquid Lq from the heater circuit 130 toward the heating flow path 151 at the connection point CP1. The flow f2 is a flow of the temperature control liquid Lq from the heater 131 toward the heater core HC at the connection point CP1.

The second valve 62 is configured to open and close the second cooling flow path 155. The second valve 62 in this embodiment is provided at the branch point 159. The second valve 62 is configured to open and close the first cooling flow path 154 in addition to the second cooling flow path 155. More specifically, the second valve 62 is configured to be able to switch between a state where both the first cooling flow path 154 and the second cooling flow path 155 are opened, a state where only the first cooling flow path 154 is opened, a state where only the second cooling flow path 155 is opened, and a state where both the first cooling flow path 154 and the second cooling flow path 155 are closed. It can be said that the second valve 62 regulates and allows a flow f3 and a flow f4, separately. The flow f3 is a flow of the temperature control liquid Lq from the common flow path 153 toward the second cooling flow path 155 at the branch point 159. The flow f4 is a flow of the temperature control liquid Lq from the common flow path 153 toward the first cooling flow path 154 at the branch point 159.

The third valve 63 is provided at a connection point CP2 between the cooling circuit 110 and the cooling flow path 152. The third valve 63 is configured to open and close the cooling circuit 110 and the cooling flow path 152. More specifically, the third valve 63 is configured to be able to switch between a state where both the first flow path 11 of the cooling circuit 110 and the common flow path 153 of the cooling flow path 152 are opened, a state where only the first flow path 11 is opened, a state where only the common flow path 153 is opened, and a state where both the first flow path 11 and the common flow path 153 are closed. It can be said that the third valve 63 regulates and allows a flow f5 and a flow f6, separately. The flow f5 is a flow of the temperature control liquid Lq from the cooling circuit 110 toward the common flow path 153 at the connection point CP2. The flow f6 is a flow of the temperature control liquid Lq from upstream to downstream of the cooling circuit 110 at the connection point CP2.

The fourth valve 74 is provided at the branch point 78 of the refrigerant flow path 70. The fourth valve 74 is configured to open and close the first refrigerant flow path 71 and the second refrigerant flow path 72. More specifically, the fourth valve 74 is configured to be able to switch between a state where both the first refrigerant flow path 71 and the second refrigerant flow path 72 are open, a state where only the first refrigerant flow path 71 is open, a state where only the second refrigerant flow path 72 is open, and a state where both the first refrigerant flow path 71 and the second refrigerant flow path 72 are closed. It can be said that the fourth valve 74 regulates and allows a flow f7 and a flow f8, separately. The flow f7 is a flow of the refrigerant flowing from the water-cooled condenser 173 toward the first expansion valve 175 at the branch point 78. The flow f8 is a flow of the refrigerant flowing from the water-cooled condenser 173 toward the second expansion valve 176 at the connection point CP3.

The control unit 300 is a control device that controls the overall operation of the temperature control system 100. The control unit 300 includes one or more processors 310, a storage device 320 including a main storage device and an auxiliary storage device, an input-output interface that inputs and outputs signals to and from the outside, and an internal bus. The processor 310, the storage device 320, and the input-output interface are communicably connected to each other via an internal bus. By executing the program stored in the storage device 320, the processor 310 causes the control unit 300 to implement a function of controlling, for example, the pump 102, the first cooling unit 111, the second cooling unit 160, the heater 131, the HVAC system 250, and various valves in the temperature control system 100. In another embodiment, the control unit 300 may be implemented by, for example, a combination of a plurality of circuits. For example, a control computer for controlling driving of the electric vehicle Vc and various operations may function as the control unit 300.

FIG. 2 is a diagram illustrating examples of control modes of the temperature control system 100. FIG. 2 illustrates a first mode Md1 to a twelfth mode Md12 as the examples of the control modes of the temperature control system 100. FIG. 2 illustrates a mode selection condition representing a condition under which each control mode is selected and control details of each control mode. In the present embodiment, the control unit 300 selects a control mode according to the mode selection condition.

In FIG. 2, "vehicle interior air conditioning", "cooling of object to be cooled", "battery temperature control" and "cooling of charging unit" are illustrated as the mode selection conditions. In addition, in FIG. 2, whether each flow is regulated or allowed by each valve, whether the heater 131 is turned on or off, and whether the chiller 170 is turned on or off are illustrated as the control details.

Among the mode selection conditions, the "vehicle interior air conditioning" represents a necessity for air conditioning in the vehicle interior of the electric vehicle Vc, and indicates whether heating or cooling of the vehicle interior is necessary, or whether neither is necessary.

The "cooling of object to be cooled" represents a necessity for cooling of the object to be cooled 20 and indicates whether cooling of the object to be cooled 20 is necessary. For example, when a measurement value of a temperature sensor (not illustrated) that measures the temperature of the inverter Iv is higher than a threshold value, the control unit 300 determines that the cooling of the object to be cooled 20 is necessary. The threshold value is determined, for example, based on an allowable temperature limit of a semiconductor included in the inverter Iv, and is preferably 125° C. or lower, more preferably 80° C. or lower, and even more preferably 70° C. or lower. The threshold value is preferably 60° C. or more in order to prevent energy loss due to excessive cooling of the inverter Iv. The inverter Iv is not driven when the electric vehicle Vc is stopped (including when the electric vehicle Vc is in charging), and is driven when the electric vehicle Vc travels. Therefore, the inverter Iv and the temperature rise mainly when the electric vehicle Vc travels, and are particularly likely to rise during high-speed traveling as compared to normal traveling. The normal traveling refers to the electric vehicle Vc traveling at a speed lower than a predetermined reference speed (for example, 80 km/h). The high-speed traveling refers to the electric vehicle Vc traveling at a predetermined reference speed or higher.

The "battery temperature control" represents a necessity for temperature control of the battery DB, and indicates whether heating or cooling of the battery DB is necessary, or neither is necessary. Note that "cooling (intense)" in FIG. 2 indicates a necessity for high-intensity cooling of the battery DB. The control unit 300 determines that the cooling of the battery DB is necessary when a measurement value of the temperature sensor 91 is higher than a predetermined optimum temperature range for the battery DB, and determines that the heating of the battery DB is necessary when a measurement value of the temperature sensor is lower than the optimum temperature range. The control unit 300 determines that the high-intensity cooling is necessary when a value of the temperature sensor is lower than a predetermined temperature that is lower than the lower limit of the optimum temperature range. The optimum temperature range of the battery DB is determined, for example, as a temperature range that allows the battery DB to achieve higher charging and discharging performance. For example, when the battery DB is implemented by a lithium ion battery with electrolyte, the lower limit of the optimum temperature range of the battery DB is preferably 10° C. or higher, and more preferably 20° C. or higher. In this case, an upper limit of the optimum temperature range of the battery DB is preferably 30° C. or lower, more preferably 25° C. or lower. The temperature of the battery DB decreases, for example, due to a decrease in the outside temperature, and increases due to driving of electric vehicle Vc and charging of the battery DB using an external power supply and the charging unit CU. In particular, the temperature of the battery DB is likely to increase due to the high-speed traveling as compared to the normal traveling, and is likely to increase due to rapid charging as compared to normal charging. The rapid charging refers to charging the battery DB at a higher speed than normal charging. In the rapid charging, an external charger capable of supplying higher output power than an external charger used for normal charging of the battery DB is used.

The "cooling of charging unit" represents a necessity for cooling of the charging unit CU and indicates whether cooling of the charging unit CU is necessary. For example, when a measurement value of a temperature sensor (not illustrated) that measures the temperature of the charging unit CU is higher than a predetermined threshold value, the control unit 300 determines that the cooling of the charging unit CU is necessary. It is preferable that this threshold value is determined such that, for example, a decrease in the charging performance of the battery DB due to heating of the charging unit CU may be reduced. The charging performance of the charging unit CU decreases due to an excessive rise in temperature of a connector portion of the charging unit CU to which an external conductor is connected for charging the battery DB, for example. The charging unit CU is not operated while the electric vehicle Vc is traveling or simply stopped, and is operated when the battery DB is being charged. Therefore, the temperature of the charging unit CU rises mainly during charging of the battery DB, and is more likely to rise due to rapid charging as compared with normal charging.

As shown in FIG. 2, the first mode Md1 to a fourth mode Md4 are selected when there is a necessity for heating in the vehicle interior. Therefore, the first mode Md1 to the fourth mode Md4 are likely to be selected, for example, in a cold environment (for example, in winter). A fifth mode Md5 to an eighth mode Md8 are executed when neither heating nor cooling is necessary. Therefore, the fifth mode Md5 to the eighth mode Md8 are likely to be selected, for example, in spring or autumn. A ninth mode Md9 to the twelfth mode Md12 are executed when there is a necessity for cooling in the vehicle interior. Therefore, the ninth mode Md9 to the twelfth mode Md12 are likely to be selected, for example, in summer.

Figure 3:
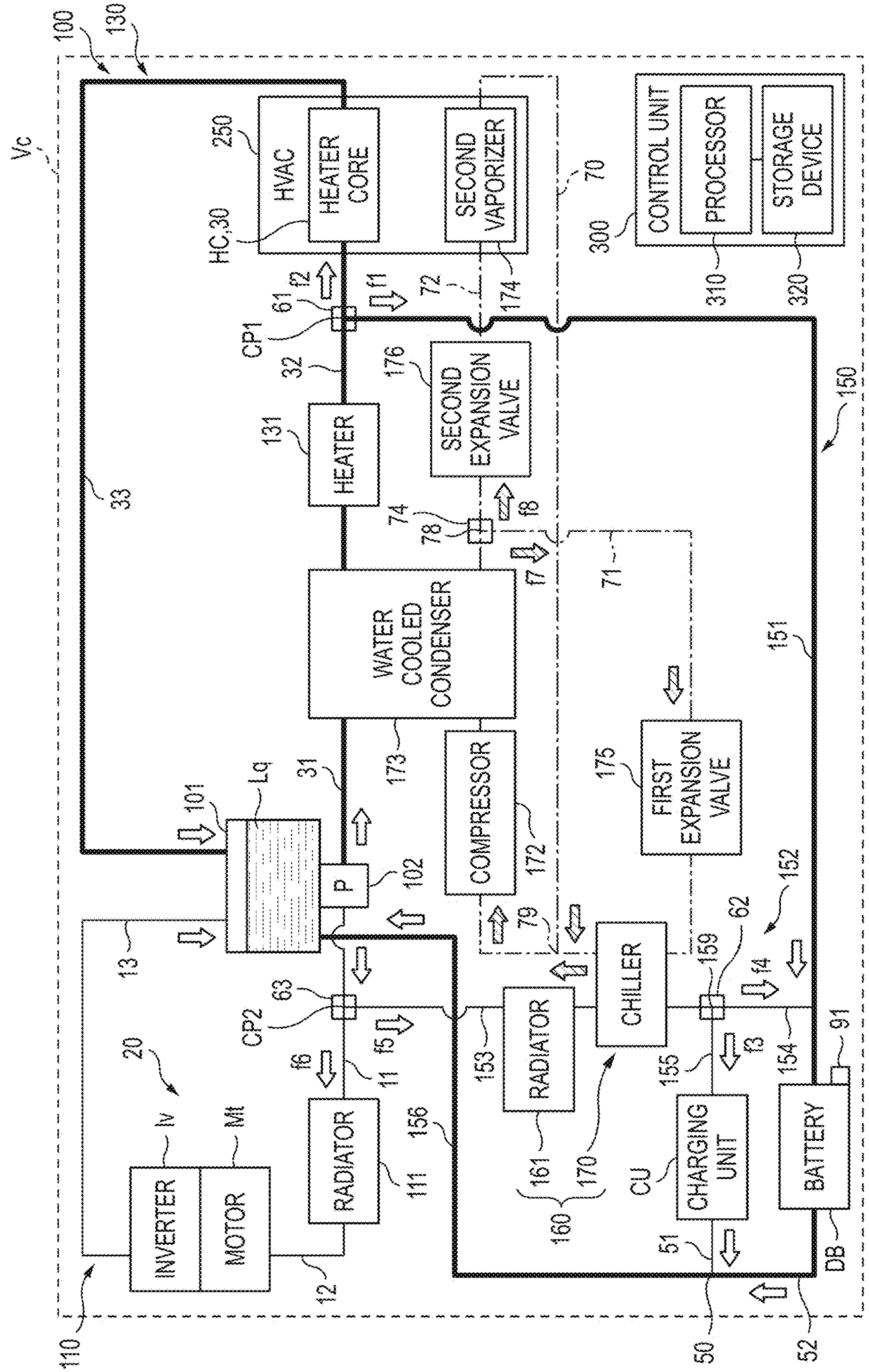
FIG. 3 is a diagram illustrating how the temperature control system is controlled in a first mode.

FIG. 3 is a diagram illustrating how the temperature control system 100 is controlled in the first mode Md1. In FIG. 3, among the flow paths in each circuit, a flow path through which the temperature control liquid Lq flows is indicated by a thick line. The first mode Md1 is selected, for example, immediately after the electric vehicle Vc is started on a winter morning when the outside temperature is particularly likely to drop (for example, 20° C. below the freezing point). As illustrated in FIGS. 2 and 3, in the first mode Md1, the first valve 61 is controlled to allow the flows f1 and f2, the second valve 62 is controlled to regulate the flows f3 and f4, the third valve 63 is controlled to regulate the flows f5 and f6, the fourth valve 74 is controlled to regulate the flows f7 and f8, the heater 131 is controlled to be ON, and the chiller 170 is controlled to be OFF. As a result, in the first mode Md1, as illustrated in FIG. 3, the object to be heated 30 is heated by the heater circuit 130, and the temperature control liquid Lq heated by the heater circuit 130 is supplied to the battery DB via the heating flow path 151 to heat the battery DB.

Figure 4:
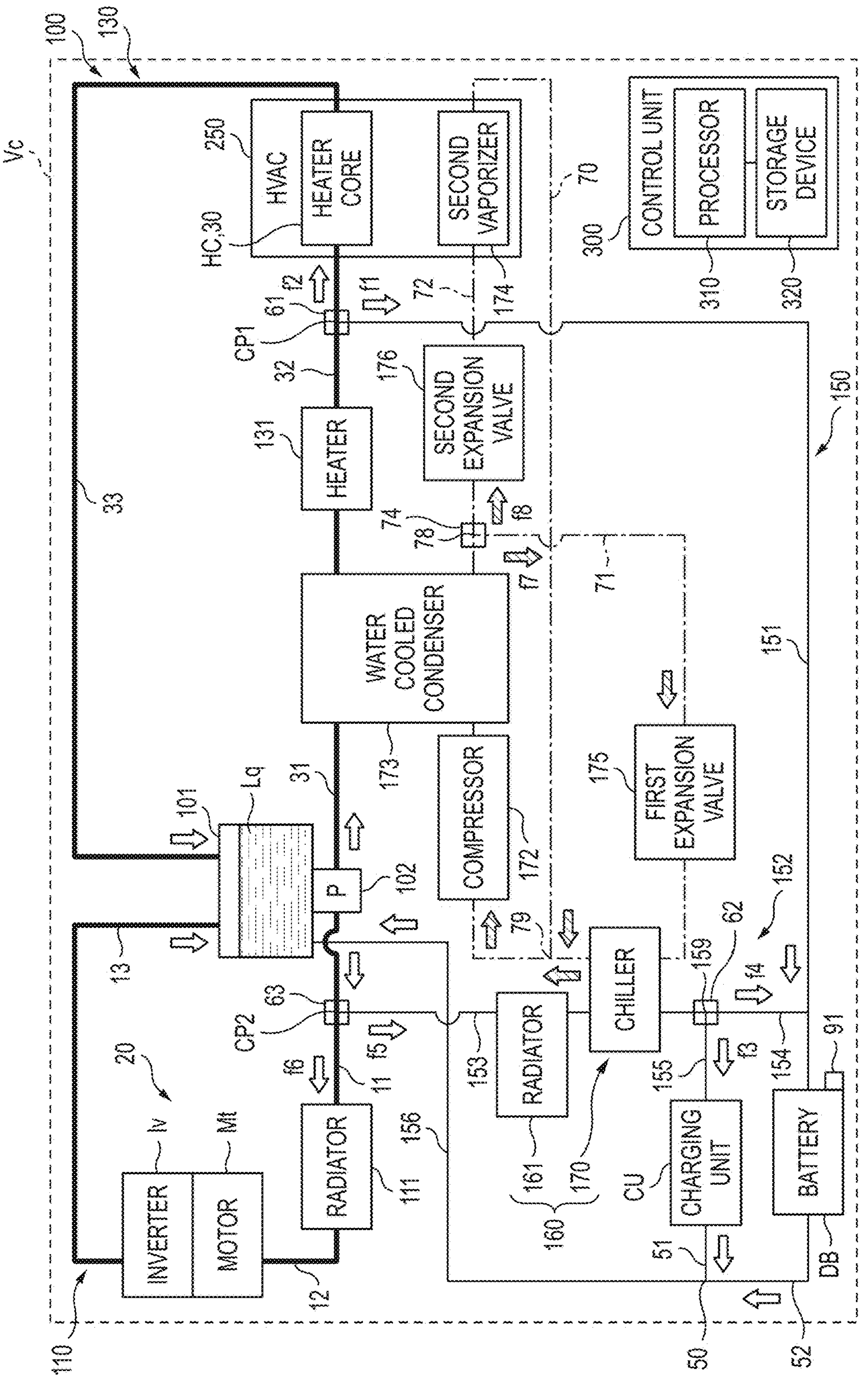
FIG. 4 is a diagram illustrating how the temperature control system is controlled in a second mode.

FIG. 4 is a diagram illustrating how the temperature control system 100 is controlled in the second mode Md2 in substantially the same manner as in FIG. 3. The second mode Md2 is selected, for example, when the electric vehicle Vc normally travels in winter. As illustrated in FIGS. 2 and 4, in the second mode Md2, the first valve 61 is controlled to regulate the flow f1 and to allow only the flow f2, the second valve 62 is controlled to regulate the flows f3 and f4, the third valve 63 is controlled to regulate the flow f5 and to allow only the flow f6, the fourth valve 74 is controlled to regulate the flows f7 and f8, the heater 131 is controlled to be ON, and the chiller 170 is controlled to be OFF. As a result, in the second mode Md2, as illustrated in FIG. 4, the object to be cooled 20 is cooled by the cooling circuit 110, and the object to be heated 30 is heated by the heater circuit 130. The temperature control liquid Lq that has cooled the object to be cooled 20 in the cooling circuit 110 is recovered to the reserve tank 101. As a result, waste heat in the cooling circuit 110 is recovered to the reserve tank 101 via the temperature control liquid Lq. The temperature of the temperature control liquid Lq in the reserve tank 101 is increased by the waste heat recovered in this manner. That is, in the second mode Md2, waste heat in the cooling circuit 110 that is recovered to the reserve tank 101 may be used for heating the object to be heated 30 via the temperature control liquid Lq.

Figure 5:
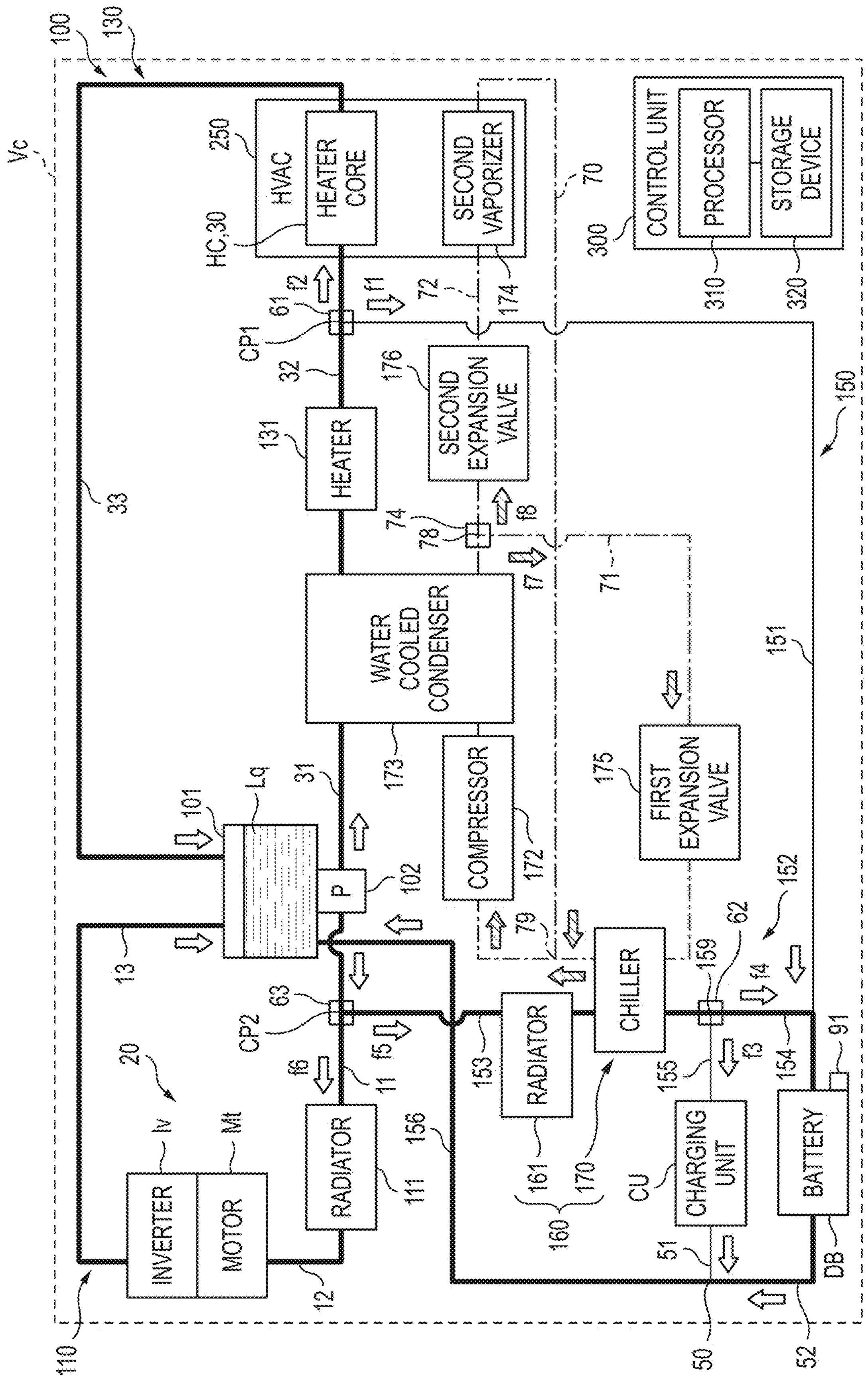
FIG. 5 is a diagram illustrating how the temperature control system is controlled in a third mode.

FIG. 5 is a diagram illustrating how the temperature control system 100 is controlled in the third mode Md3 in substantially the same manner as in FIG. 3. The third mode Md3 is selected, for example, when the electric vehicle Vc travels at high speed in winter. As illustrated in FIGS. 2 and 5, in the third mode Md3, the first valve 61 is controlled to allow only the flow f2, the second valve 62 is controlled to regulate the flow f3 and to allow only the flow f4, the third valve 63 is controlled to allow the flows f5 and f6, the fourth valve 74 is controlled to regulate the flows f7 and f8, the heater 131 is controlled to be ON, and the chiller 170 is controlled to be OFF. As a result, in the third mode Md3, the object to be cooled 20 is cooled by the cooling circuit 110, and the temperature control liquid Lq cooled by the radiator 161 of the second cooling unit 160 is supplied to the battery DB via the first cooling flow path 154 so as to cool the battery DB. The object to be heated 30 is heated by the heater circuit 130. The temperature control liquid Lq that has cooled the object to be cooled 20 in the cooling circuit 110 and the temperature control liquid Lq that has cooled the battery DB in the temperature control circuit 150 are separately recovered to the reserve tank 101. As a result, waste heat in the cooling circuit 110 and in the temperature control circuit 150 is recovered to the reserve tank 101 via the temperature control liquid Lq. That is, in the third mode Md3, waste heat in the cooling circuit 110 and in the temperature control circuit 150 that is recovered to the reserve tank 101 may be used for heating the object to be heated 30 via the temperature control liquid Lq.

The above-described first mode Md1 may also be selected, for example, in a state where the electric vehicle Vc is stopped after the electric vehicle Vc travels normally or travels at high speed. More specifically, when the temperature of the battery DB falls below the optimum temperature range due to the influence of the low outside temperature while the electric vehicle Vc is stopped, the first mode Md1 is selected. In this case, waste heat recovered to the reserve tank 101 in the second mode Md2 or the third mode Md3 before the first mode Md1 is selected may be used for heating the battery DB. When it is necessary to cool the object to be cooled 20 in addition to the heating of the battery DB, the object to be cooled 20 may be cooled by changing a control state of the third valve 63 in the first mode Md1 to a control state of the third valve 63 to allow the flow f6.

Figure 6:
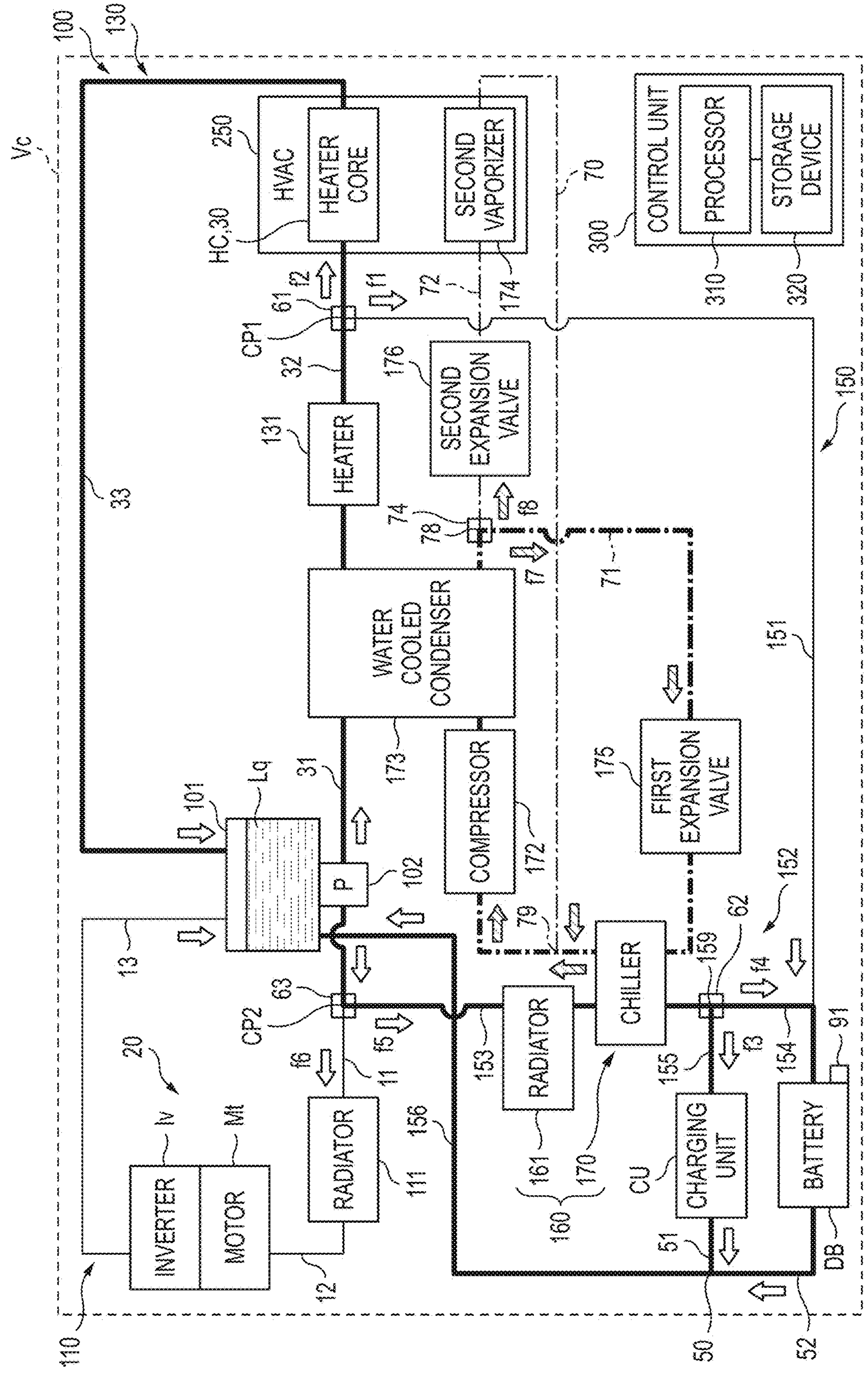
FIG. 6 is a diagram illustrating how the temperature control system is controlled in a fourth mode.

FIG. 6 is a diagram illustrating how the temperature control system 100 is controlled in the fourth mode Md4 in substantially the same manner as in FIG. 3. In FIG. 6, among the flow paths in the refrigerant flow path 70, a flow path through which the refrigerant flows is indicated by a thick line. The fourth mode Md4 is selected, for example, when charging the battery DB in winter. In particular, the fourth mode Md4 is selected when rapidly charging the battery DB in winter. As illustrated in FIGS. 2 and 6, in the fourth mode Md4, the first valve 61 is controlled to allow only the flow f2, the second valve 62 is controlled to allow only the flow f4, the third valve 63 is controlled to allow only the flow f5 and to regulate the flow f6, the fourth valve 74 is controlled to allow only the flow f7 and to regulate the flow f8, and the heater 131 and the chiller 170 are controlled to be ON. As a result, in the fourth mode Md4, as illustrated in FIG. 6, the temperature control liquid Lq cooled by the radiator 161 and the chiller 170 of the second cooling unit 160 is supplied to the battery DB via the first cooling flow path 154, so that the battery DB is cooled. The cooled temperature control liquid Lq is supplied to the charging unit CU through the second cooling flow path 155, so that the charging unit CU is cooled. The object to be heated 30 is heated by the heater circuit 130. The temperature control liquid Lq that has cooled the battery DB and the charging unit CU in the temperature control circuit 150 is recovered to the reserve tank 101. As a result, waste heat in the temperature control circuit 150 is recovered to the reserve tank 101 via the temperature control liquid Lq. That is, in the third mode Md3, waste heat in the temperature control circuit 150 that is recovered to the reserve tank 101 may be used for heating the object to be heated 30 via the temperature control liquid Lq.

The fifth mode Md5 is selected, for example, immediately after the electric vehicle Vc is started in an environment in which air conditioning in the vehicle interior is not necessary such as in spring or autumn. As shown in FIG. 2, in the fifth mode Md5, each valve is controlled so as to regulate all the flows f1 to f8, and the heater 131 and the chiller 170 are controlled to be OFF.

Figure 7:
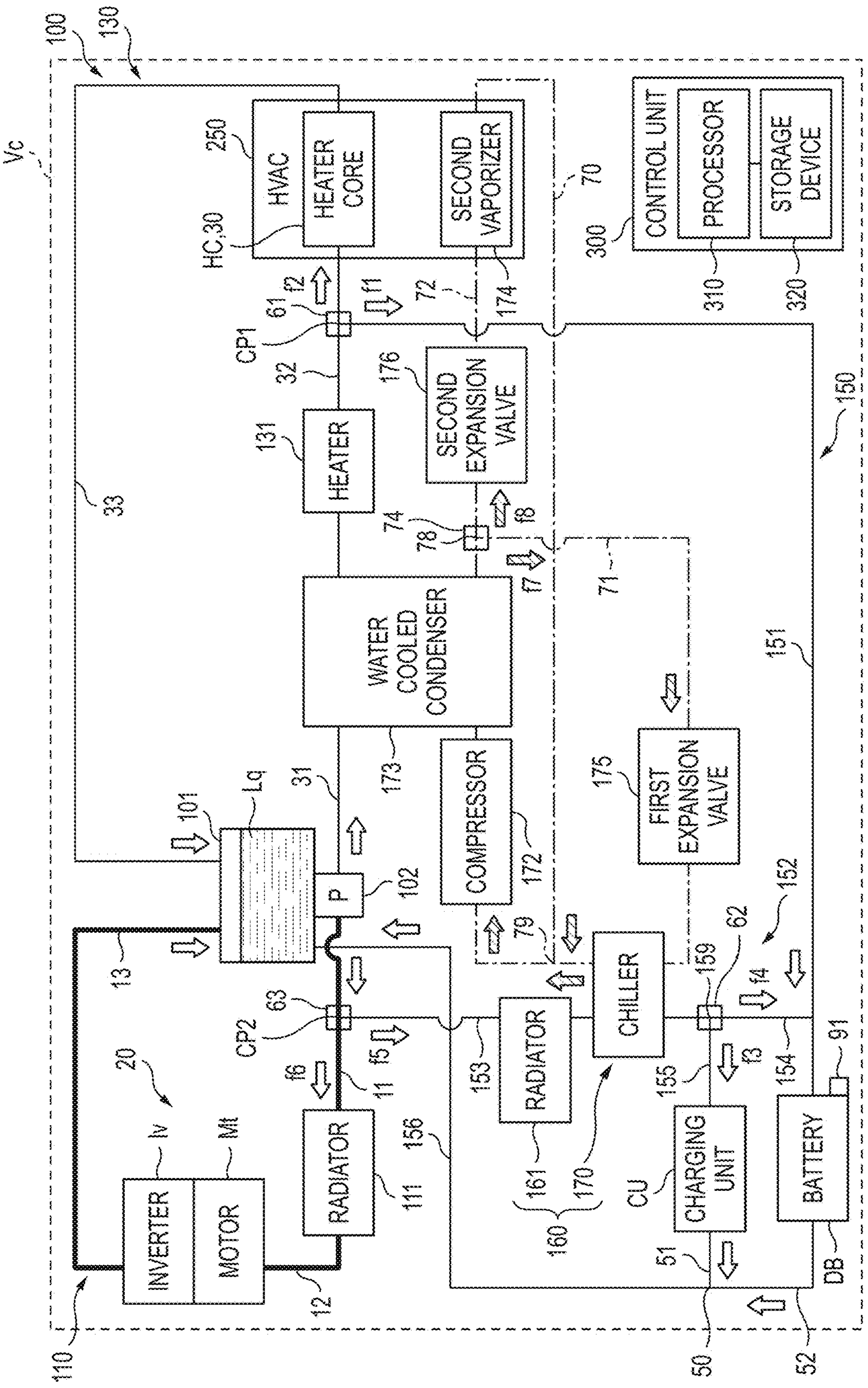
FIG. 7 is a diagram illustrating how the temperature control system is controlled in a sixth mode.

FIG. 7 is a diagram illustrating how the temperature control system 100 is controlled in the sixth mode Md6 in substantially the same manner as in FIG. 6. The sixth mode Md6 is selected, for example, in a case where the electric vehicle Vc travels normally in an environment in which air conditioning in the vehicle interior is not necessary. As illustrated in FIGS. 2 and 7, in the sixth mode Md6, the first valve 61 is controlled to regulate the flows f1 and f2, the second valve 62 is controlled to regulate the flows f3 and f4, the third valve 63 is controlled to allow only the flow f6, the fourth valve 74 is controlled to regulate the flows f7 and f8, and the heater 131 and the chiller 170 are controlled to be OFF. As a result, in the sixth mode Md6, as illustrated in FIG. 7, the object to be cooled 20 is cooled by the cooling circuit 110.

Figure 8:
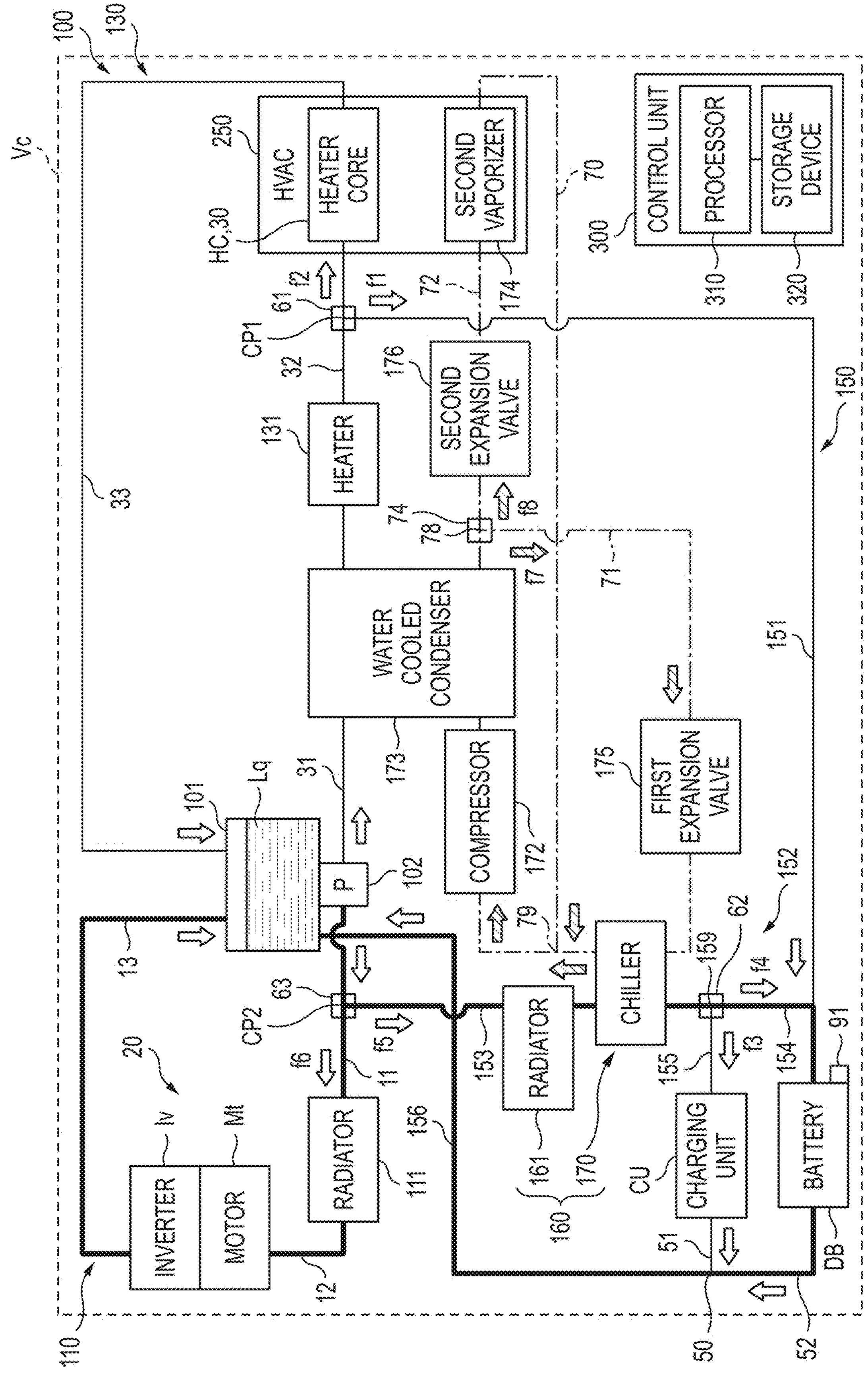
FIG. 8 is a diagram illustrating how the temperature control system is controlled in a seventh mode.

FIG. 8 is a diagram illustrating how the temperature control system 100 is controlled in the seventh mode Md7 in substantially the same manner as in FIG. 6. The seventh mode Md7 is selected, for example, in a case where the electric vehicle Vc travels at high speed in an environment in which air conditioning in the vehicle interior is not necessary. As illustrated in FIGS. 2 and 8, in the seventh mode Md7, the first valve 61 is controlled to regulate the flows f1 and f2, the second valve 62 is controlled to allow only the flow f4, the third valve 63 is controlled to allow the flows f5 and f6, the fourth valve 74 is controlled to regulate the flows f7 and f8, and the heater 131 and the chiller 170 are controlled to be OFF. As a result, in the seventh mode Md7, as illustrated in FIG. 8, the object to be cooled 20 is cooled by the cooling circuit 110, and the temperature control liquid Lq cooled by the radiator 161 of the second cooling unit 160 is supplied to the battery DB via the first cooling flow path 154 so as to cool the battery DB.

Figure 9:
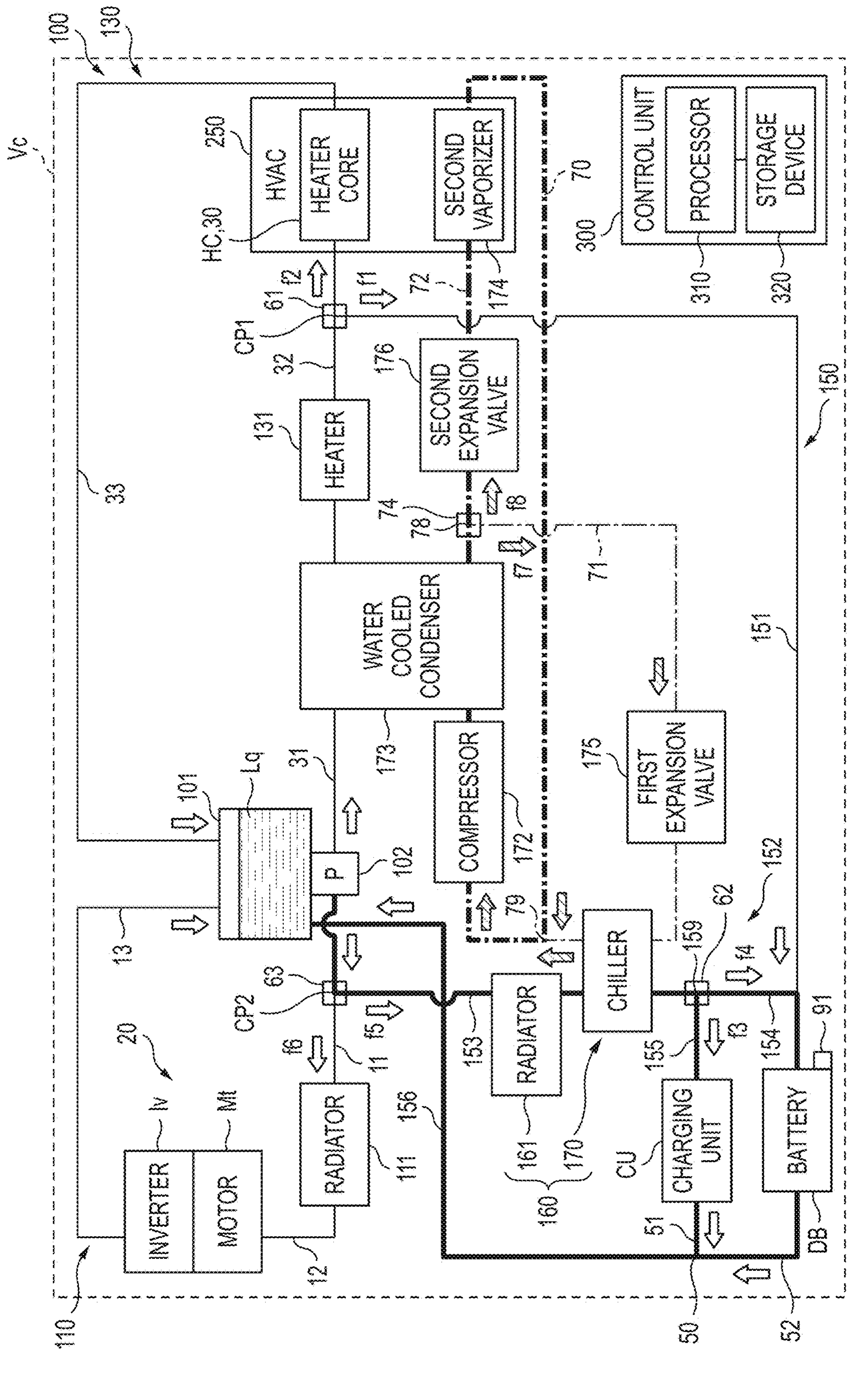
FIG. 9 is a diagram illustrating how the temperature control system is controlled in an eighth mode.

FIG. 9 is a diagram illustrating how the temperature control system 100 is controlled in the eighth mode Md8 in substantially the same manner as in FIG. 6. The eighth mode Md8 is selected, for example, in a case where the battery DB is charged in an environment where air conditioning in the vehicle interior is not necessary, particularly when the battery DB is rapidly charged. As illustrated in FIGS. 2 and 9, in the eighth mode Md8, the first valve 61 is controlled to regulate the flows f1 and f2, the second valve 62 is controlled to allow only the flow f4, the third valve 63 is controlled to allow only the flow f5, the fourth valve 74 is controlled to allow only the flow f7, the heater 131 is controlled to be OFF, and the chiller 170 is controlled to be ON. As a result, in the eighth mode Md8, as illustrated in FIG. 9, the temperature control liquid Lq cooled by the radiator 161 and the chiller 170 of the second cooling unit 160 is supplied to the battery DB via the first cooling flow path 154, so that the battery DB is cooled. The cooled temperature control liquid Lq is supplied to the charging unit CU through the second cooling flow path 155, so that the charging unit CU is cooled.

Figure 10:
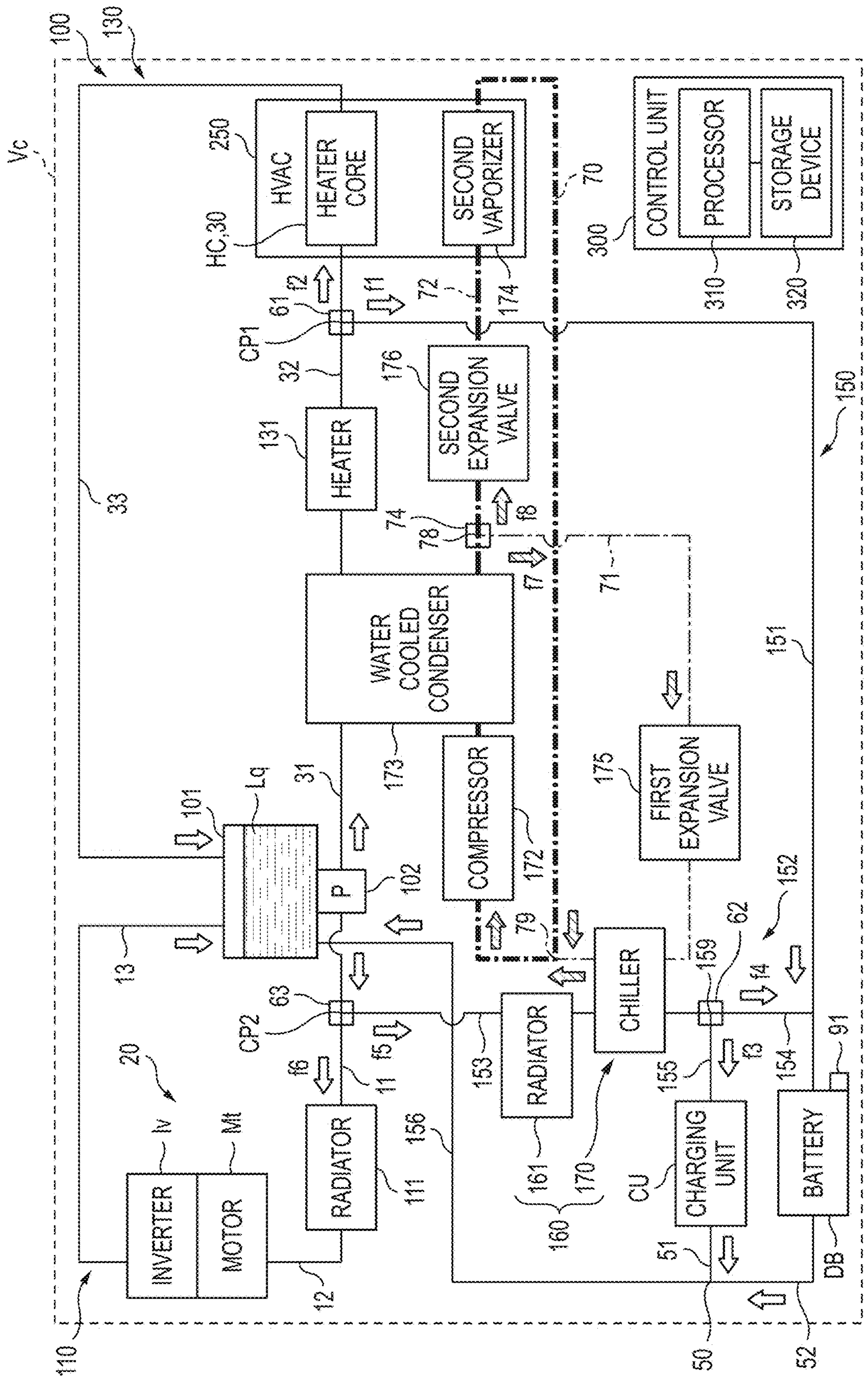
FIG. 10 is a diagram illustrating how the temperature control system is controlled in a ninth mode.

FIG. 10 is a diagram illustrating how the temperature control system 100 is controlled in the ninth mode Md9 in substantially the same manner as in FIG. 6. The ninth mode Md9 is selected, for example, immediately after the electric vehicle Vc is started in summer when the outside temperature is relatively high (for example, 30° C.). As illustrated in FIGS. 2 and 10, in the ninth mode Md9, the first valve 61 is controlled to regulate the flows f1 and f2, the second valve 62 is controlled to regulate the flows f3 and f4, the third valve 63 is controlled to regulate the flows f5 and f6, the fourth valve 74 is controlled to regulate the flow f7 and to allow only the flow f8, the heater 131 is controlled to be OFF, and the chiller 170 is controlled to be ON. As a result, in the ninth mode Md9, the temperature control using the temperature control liquid Lq in each circuit is not performed, and only the cooling of the vehicle interior using the chiller 170 is performed.

Figure 11:
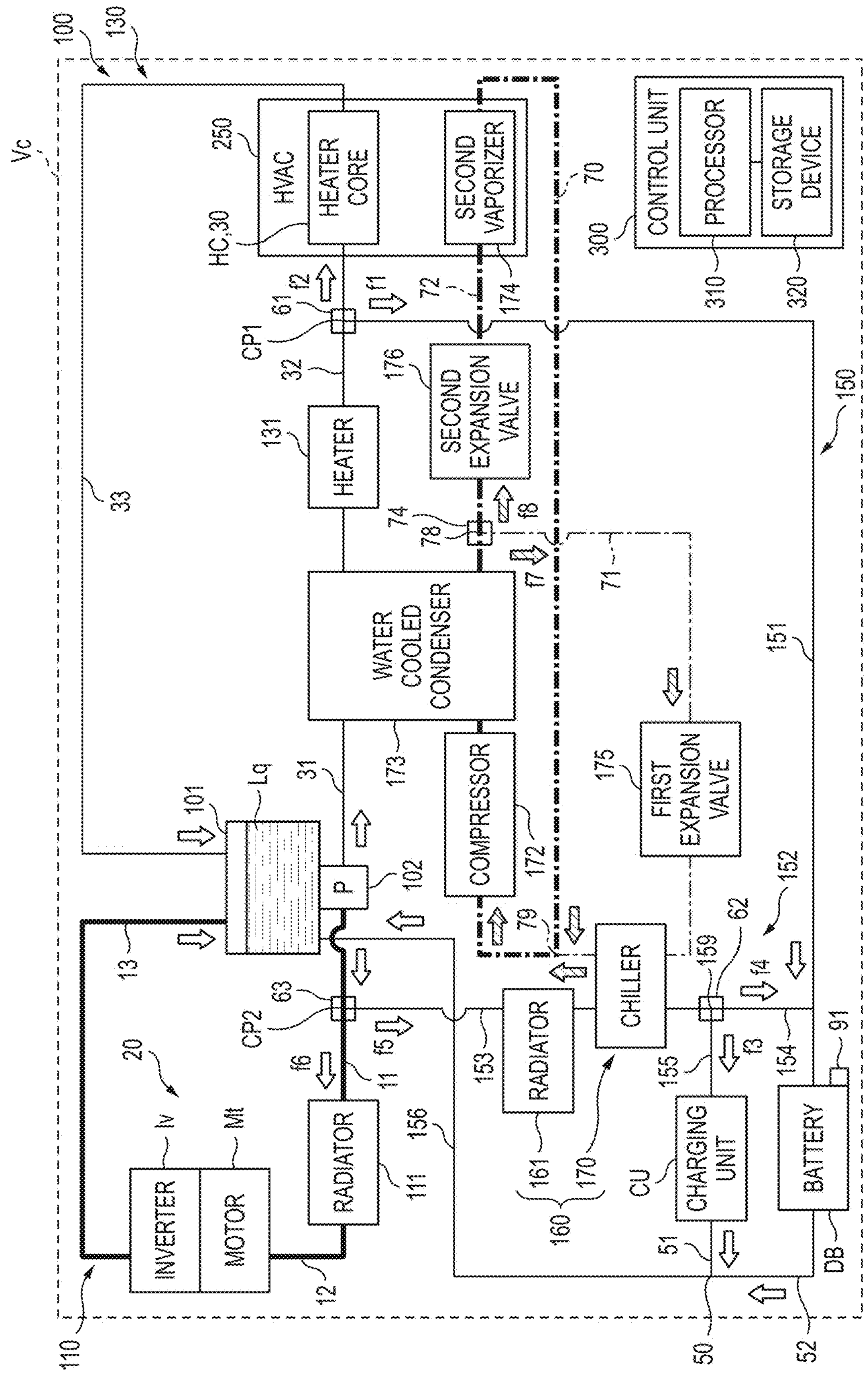
FIG. 11 is a diagram illustrating how the temperature control system is controlled in a tenth mode.

FIG. 11 is a diagram illustrating how the temperature control system 100 is controlled in the tenth mode Md10 in substantially the same manner as in FIG. 6. The tenth mode Md10 is selected, for example, when the electric vehicle Vc normally travels in summer. As illustrated in FIGS. 2 and 10, in the tenth mode Md10, the first valve 61 is controlled to regulate the flows f1 and f2, the second valve 62 is controlled to regulate the flows f3 and f4, the third valve 63 is controlled to allow only the flow f6, the fourth valve 74 is controlled to allow only the flow f8, the heater 131 is controlled to be OFF, and the chiller 170 is controlled to be ON. As a result, in the tenth mode Md10, as illustrated in FIG. 11, the object to be cooled 20 is cooled by the cooling circuit 110, and the cooling of the vehicle interior using the chiller 170 is performed.

Figure 12:
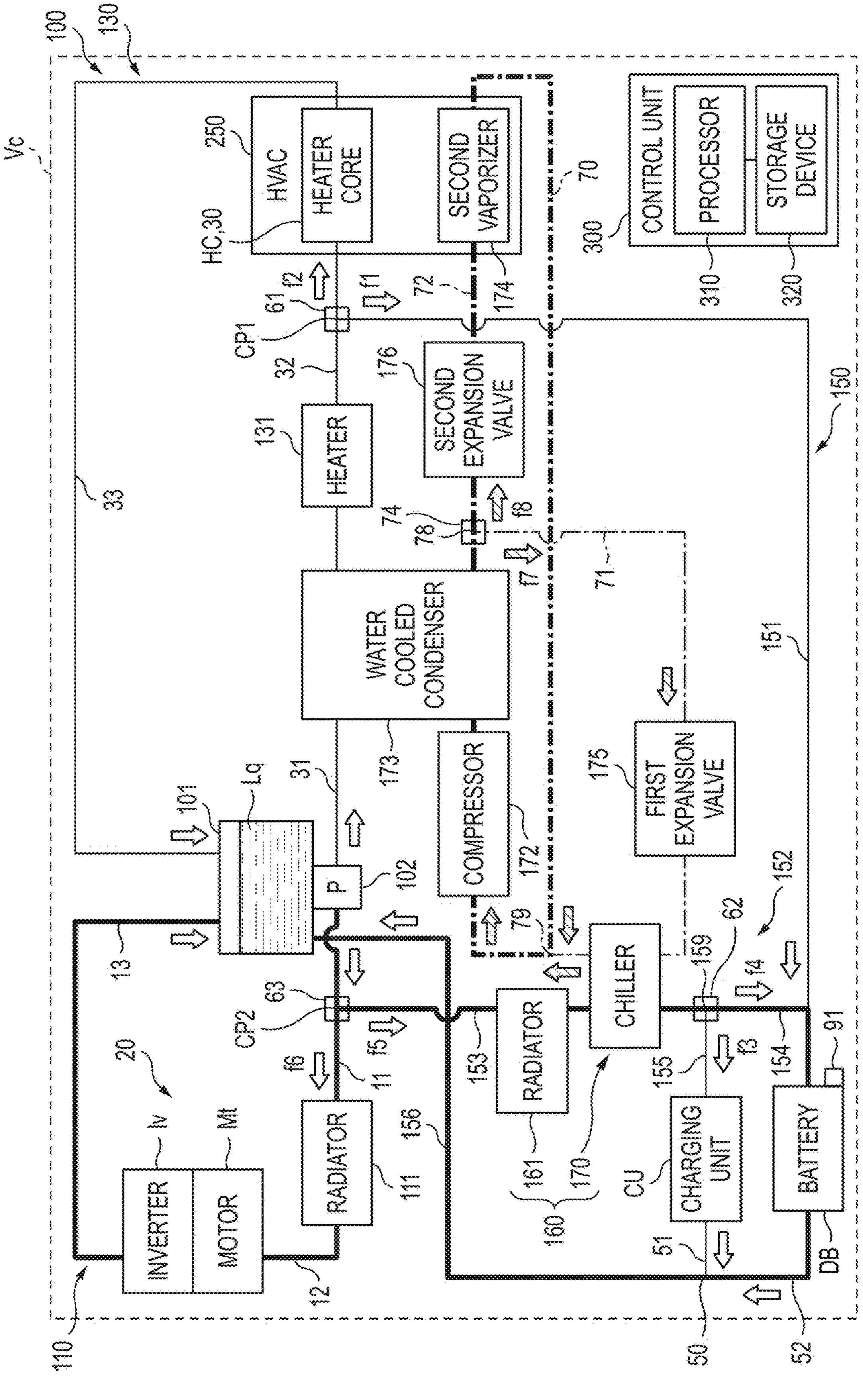
FIG. 12 is a diagram illustrating how the temperature control system is controlled in an eleventh mode.

FIG. 12 is a diagram illustrating how the temperature control system 100 is controlled in the eleventh mode Md11 in substantially the same manner as in FIG. 6. The eleventh mode Md11 is selected, for example, when the electric vehicle Vc travels at high speed in summer. As illustrated in FIGS. 2 and 12, in the eleventh mode Md11, the first valve 61 is controlled to regulate the flows f1 and f2, the second valve 62 is controlled to allow only the flow f4, the third valve 63 is controlled to allow the flows f5 and f6, the fourth valve 74 is controlled to allow only the flow f8, the heater 131 is controlled to be OFF, and the chiller 170 is controlled to be ON. As a result, in the eleventh mode Md11, as illustrated in FIG. 12, the object to be cooled 20 is cooled by the cooling circuit 110, and the temperature control liquid Lq cooled by the radiator 161 of the second cooling unit 160 is supplied to the battery DB via the cooling flow path 152 so as to cool the battery DB. The cooling of the vehicle interior using the chiller 170 is performed.

Figure 13:
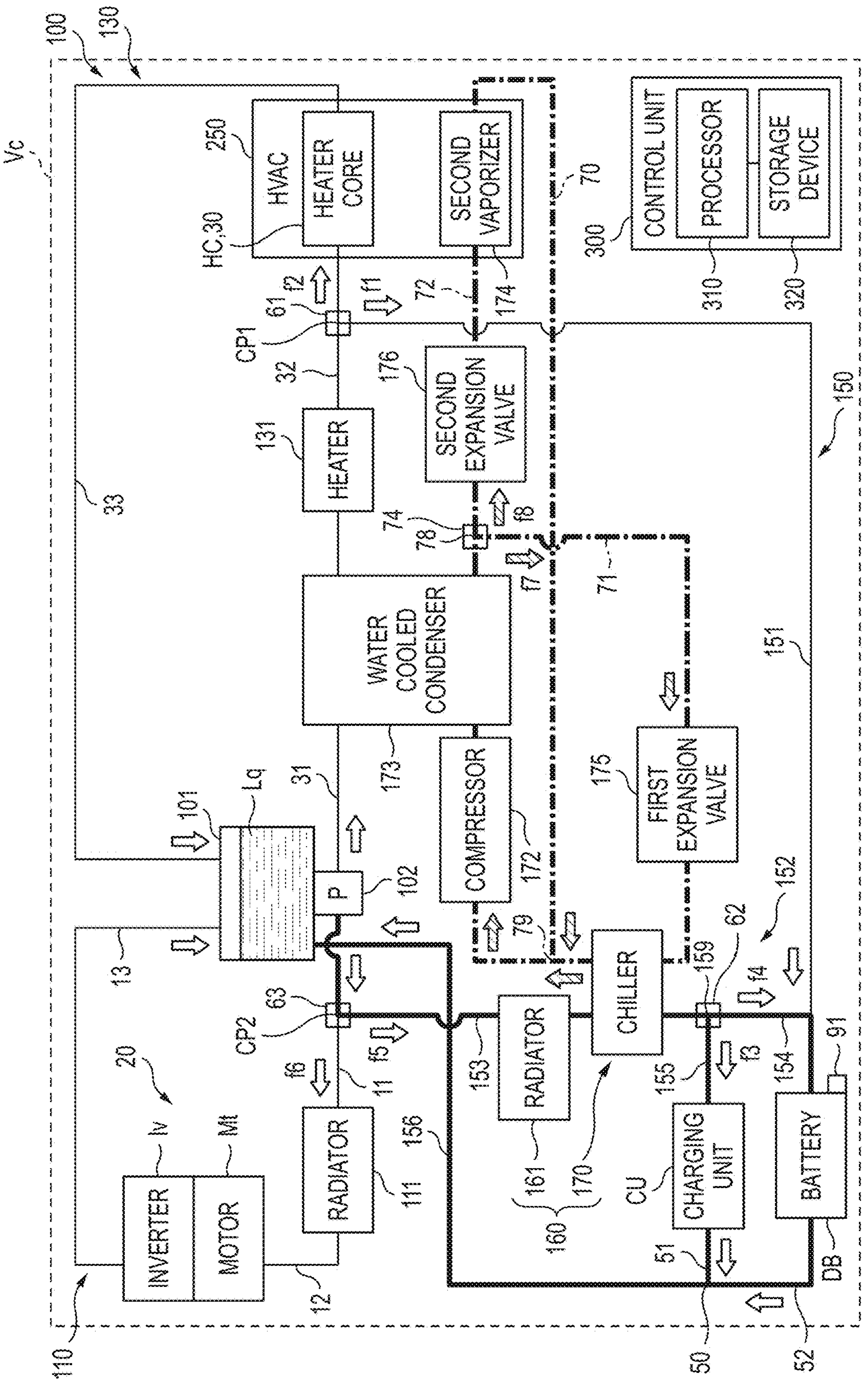
FIG. 13 is a diagram illustrating how the temperature control system is controlled in a twelfth mode.

FIG. 13 is a diagram illustrating how the temperature control system 100 is controlled in the twelfth mode Md12 in substantially the same manner as in FIG. 6. The twelfth mode Md12 is selected, for example, in a case where the battery DB is charged in summer, particularly when the battery DB is rapidly charged. As illustrated in FIGS. 2 and 13, in the twelfth mode Md12, the first valve 61 is controlled to regulate the flows f1 and f2, the second valve 62 is controlled to allow only the flow f4, the third valve 63 is controlled to allow only the flow f5, the fourth valve 74 is controlled to allow the flows f7 and f8, the heater 131 is controlled to be OFF, and the chiller 170 is controlled to be ON. As a result, in the twelfth mode Md12, as illustrated in FIG. 13, the temperature control liquid Lq cooled by the radiator 161 and the chiller 170 of the second cooling unit 160 is supplied to the battery DB via the first cooling flow path 154, so that the battery DB is cooled. The cooled temperature control liquid Lq is supplied to the charging unit CU through the second cooling flow path 155, so that the charging unit CU is cooled. The cooling of the vehicle interior using the chiller 170 is performed.

According to the temperature control system 100 of the present embodiment described above, in each of the cooling circuit 110, the heater circuit 130, and the temperature control circuit 150, the temperature of the temperature control object in each circuit may be controlled while circulating the temperature control liquid Lq. In this way, the temperature control liquid Lq after temperature control of the temperature control object in each circuit may be recovered to the reserve tank 101, so that the temperature of the temperature control liquid Lq in the reserve tank 101 may be increased using waste heat in the temperature control system 100. The battery DB may be heated by supplying the temperature control liquid Lq in the reserve tank 101 to the battery DB via the heating flow path 151 connected to the heater circuit 130. Therefore, in the temperature control system 100, the temperature of the battery DB may be effectively controlled.

Further, in the present embodiment, the cooling flow path 152 is branched into the first cooling flow path 154 and the second cooling flow path 155 at the branch point 159, and the second valve 62 configured to be able to open and close the second cooling flow path 155 is provided at the branch point 159. In this way, by opening and closing the second cooling flow path 155 using the second valve 62, it is possible to switch between a state in which the temperature control liquid Lq in the cooling flow path 152 flows to the charging unit CU and a state in which the temperature control liquid Lq does not flow to the charging unit CU. Therefore, for example, the battery DB may be more effectively cooled by closing the second cooling flow path 155 in a case where cooling of the battery DB is necessary while cooling of the charging unit CU is not necessary. In addition, since the temperature control liquid Lq for heating the battery DB may be prevented from flowing toward the charging unit CU, the battery DB may be heated more effectively.

Further, in the present embodiment, the cooling flow path 152 passes through the second cooling unit 160. Therefore, the battery DB may be cooled by using the temperature control liquid Lq cooled by the second cooling unit 160 in the cooling flow path 152.

Further, in the present embodiment, the second cooling unit 160 includes the radiator 161 and the chiller 170. Therefore, in a case where it is necessary to cool the battery DB with higher intensity, the battery DB may be cooled with higher intensity using the chiller 170 as in the fourth mode Md4, the eighth mode Md8, and the twelfth mode Md12 described above. Further, in a case where it is necessary to cool the battery DB with relatively low intensity, the battery DB may be cooled using the radiator 161 without operating the chiller 170, as in the third mode Md3, the seventh mode Md7, and the eleventh mode Md11 described above. In this way, the battery DB may be more effectively cooled in the cooling flow path 152.

Further, in the present embodiment, the chiller 170 is configured to be able to supply the heat of the temperature control liquid Lq to the heater circuit 130. In this way, the temperature control liquid Lq may be cooled by the chiller 170 in the cooling flow path 152, and the heat supplied to the refrigerant from the temperature control liquid Lq during cooling of the temperature control liquid Lq may be supplied to the heater circuit 130. Therefore, the waste heat may be effectively used in the temperature control system 100.

Further, in the present embodiment, the object to be cooled 20 includes the motor Mt and the inverter Iv for driving the electric vehicle Vc, and the object to be heated 30 includes the heater core HC used for heating the vehicle interior of the electric vehicle Vc. Therefore, the motor Mt and the inverter Iv may be cooled by the cooling circuit 110, and the heater core HC may be heated by the heater circuit 130. A necessity for cooling of the charging unit CU mainly occurs during charging of the battery DB. A necessity for cooling of the inverter Iv and the motor Mt, which are the object to be cooled 20 in the cooling circuit 110, mainly occurs during driving of the electric vehicle Vc. Therefore, by configuring the temperature control system 100 such that the charging unit CU is cooled by the temperature control circuit 150 as in the present embodiment, the cooling efficiency of the inverter Iv, the motor Mt, and the charging unit CU can be improved as compared with a case where the charging unit CU is cooled together with the inverter Iv and the motor Mt by the cooling circuit 110, for example.

In another embodiment, the object to be cooled 20 may include only one object of the motor Mt and the inverter Iv, for example. In this case, the other object that is not included in the object to be cooled 20 may be oil-cooled by, for example, a cooling system different from the temperature control system 100. In another embodiment, the object to be cooled 20 may not include, for example, the motor Mt and the inverter Iv. In this case, the object to be cooled 20 may be any object, such as a battery including a lead battery, an engine mounted on the electric vehicle Vc, various kinds of motors, various kinds of inverters, various kinds of converters, and a control computer. The object to be heated 30 may not be the heater core HC, and may be, for example, a washer fluid for cleaning the electric vehicle Vc, a seat portion, a back portion, or a head rest of a vehicle seat on which an occupant of the electric vehicle Vc sits.

B. Second Embodiment

Figure 14:
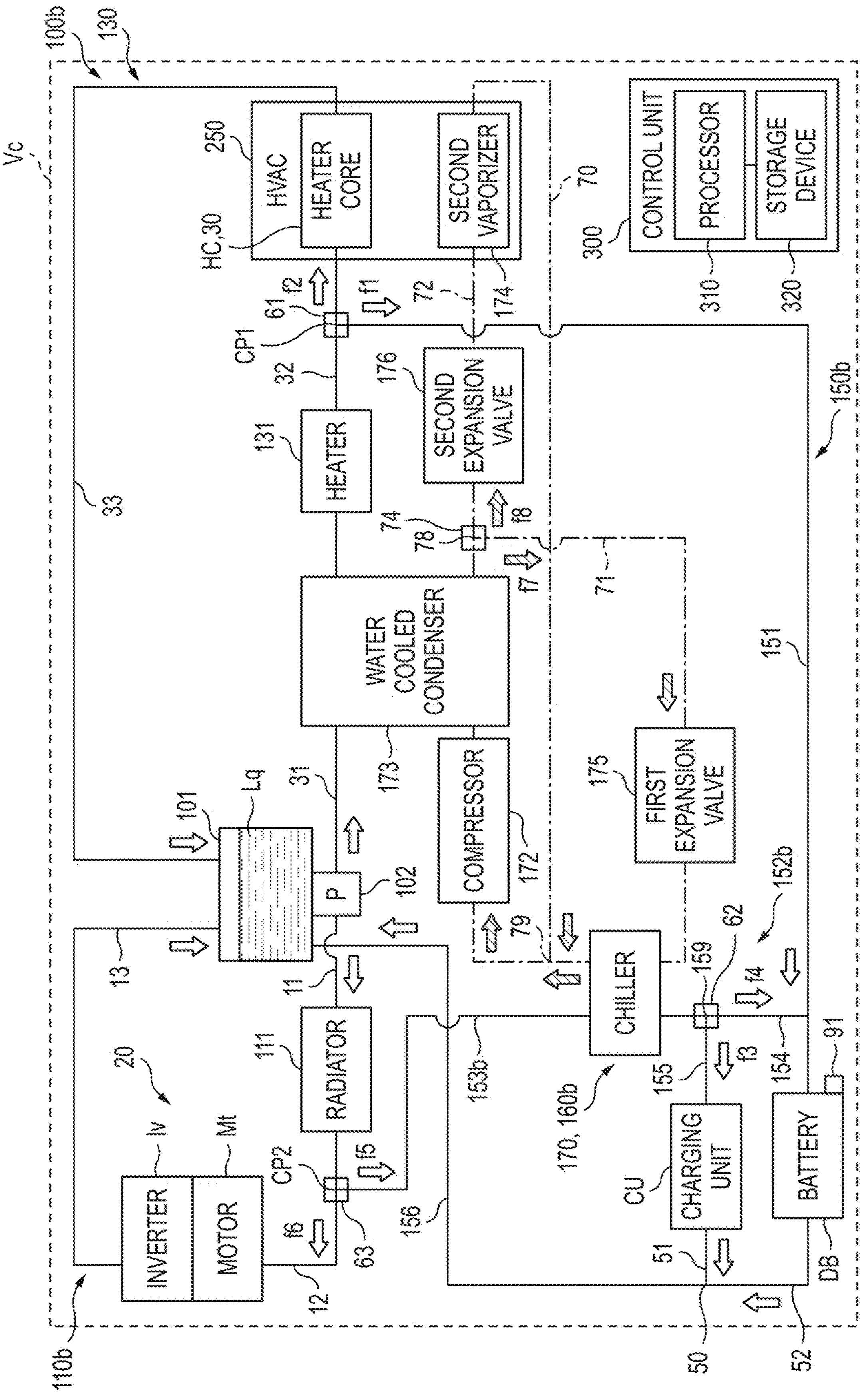
FIG. 14 is a diagram illustrating a schematic configuration of a temperature control system according to a second embodiment.

FIG. 14 is a diagram illustrating a schematic configuration of a temperature control system **100*b* according to a second embodiment. In the present embodiment, unlike the first embodiment, a cooling flow path 152*b* of a temperature control circuit 150*b* is connected to the second flow path 12 corresponding to a first portion of a cooling circuit 110*b*. As described in the first embodiment, the first portion is a portion of the cooling circuit 110*b* located downstream of the first cooling unit 111 and upstream of the object to be cooled 20. More specifically, in the present embodiment, a common flow path 153*b* of the cooling flow path 152*b* is connected to the second flow path 12. Of the configurations of the temperature control system 100*b***, portions not particularly described are the same as those in the first embodiment.

Similarly to the first embodiment, the third valve 63 is provided at the connection point CP2 between the cooling flow path **152*b* and the cooling circuit 110*b*. In the present embodiment, a second cooling unit 160*b* includes the chiller 170 as in the first embodiment, but unlike the first embodiment, the second cooling unit 160*b* does not include the radiator 161. In the temperature control system 100*b* according to the present embodiment, for example, a control mode similar to each control mode shown in FIG. 2** may also be used.

According to the temperature control system **100*b* of the second embodiment described above, the cooling flow path 152*b* is connected to the first portion of the cooling circuit 110*b*. The third valve 63 is provided at the connection point CP2. In this way, the battery DB and the charging unit CU may be cooled in the temperature control circuit 150*b* using the temperature control liquid Lq cooled in the cooling circuit 110*b*. Therefore, for example, even if the radiator 161 of the second cooling unit 160*b*** is omitted as described above, the battery DB and the charging unit CU may be effectively cooled.

C. Third Embodiment

Figure 15:
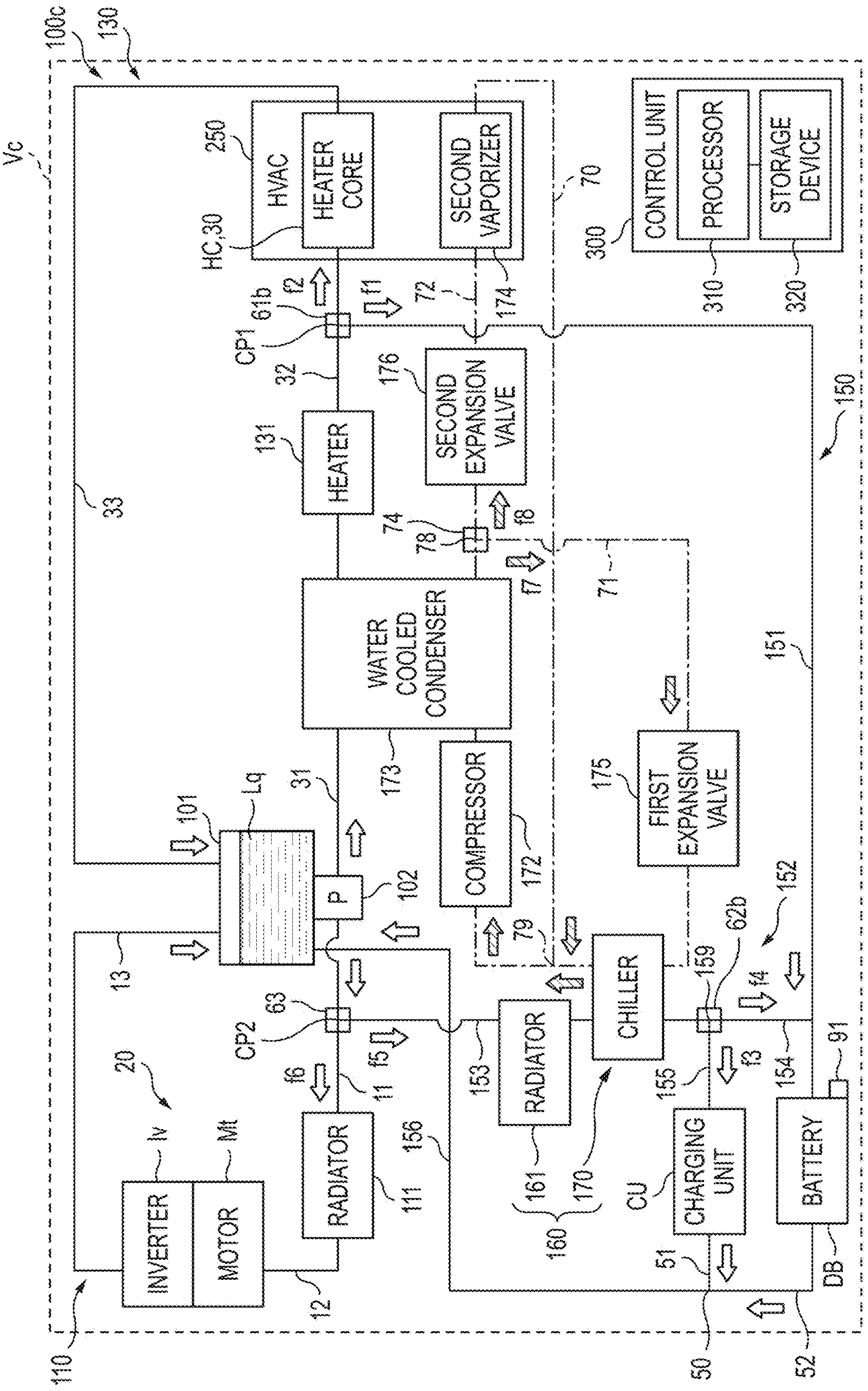
FIG. 15 is a diagram illustrating a schematic configuration of a temperature control system according to a third embodiment.

FIG. 15 is a diagram illustrating a schematic configuration of a temperature control system **100*c* according to a third embodiment. In the present embodiment, unlike the first embodiment, a first adjustment valve is provided in the cooling flow path 152. A second adjustment valve is provided in the heating flow path 151. Of the configurations of the temperature control system 100*c***, portions not particularly described are the same as those in the first embodiment.

The first adjustment valve is configured to adjust a flow rate of the cooled temperature control liquid Lq flowing through the cooling flow path 152 from the reserve tank 101 toward the battery DB. In the present embodiment, a second valve **62*b* functions as the first adjustment valve. More specifically, the second valve 62*b* in the present embodiment is configured not only to open and close the first cooling flow path 154 and the second cooling flow path 155 but also to adjust an opening degree of the first cooling flow path 154. In the present description, "adjust an opening degree of the flow path" refers to the fact that it is possible not only to open and close the flow path, but also to adjust an opening area of the flow path stepwise or steplessly. In the present embodiment, in a state in which the flow f5 is allowed by the third valve 63, by adjusting the opening degree of the first cooling flow path 154 in this way, a flow rate of the temperature control liquid Lq flowing through the first cooling flow path 154 toward the battery DB and a flow rate of the temperature control liquid Lq flowing through the second cooling flow path 155** toward the charging unit CU are adjusted.

The second adjustment valve is configured to adjust a flow rate of the temperature control liquid Lq flowing through the heating flow path 151 from the heater circuit 130 toward the battery DB. In the present embodiment, a first valve 61*b* functions as the second adjustment valve. More specifically, the first valve 61*b* in the present embodiment is configured not only to open and close the fifth flow path 32 and the heating flow path 151, but also to adjust an opening degree of the heating flow path 151. By adjusting the opening degree of the heating flow path 151 in this way, a flow rate of the temperature control liquid Lq flowing through the heating flow path 151 toward the battery DB is adjusted.

In the present embodiment, the control unit 300 controls the second valve 62*b* functioning as the first adjustment valve and the first valve 61*b* functioning as the second adjustment valve according to a measurement value of the temperature sensor 91, that is, according to the temperature of the battery DB. For example, when the temperature of the battery DB is higher than the optimum temperature range, the control unit 300 controls the second valve 62*b* and the first valve 61*b* to increase the opening degree of the first cooling flow path 154 or to decrease the opening degree of the heating flow path 151 such that the flow rate of the temperature control liquid Lq flowing through the first cooling flow path 154 becomes relatively larger than the flow rate of the temperature control liquid Lq flowing through the heating flow path 151. When there is a necessity for cooling of the battery DB with higher intensity, the control unit 300 may also increase the opening degree of the first cooling flow path 154 or decrease the opening degree of the heating flow path 151. On the contrary, when the temperature of the battery DB is lower than the optimum temperature range, the control unit 300 controls the second valve 62*b* and the first valve 61*b* to decrease the opening degree of the first cooling flow path 154 or to increase the opening degree of the heating flow path 151 such that the flow rate of the temperature control liquid Lq flowing through the first cooling flow path 154 becomes relatively smaller than the flow rate of the temperature control liquid Lq flowing through the heating flow path 151. When there is a necessity for heating of the battery DB with higher intensity, the control unit 300 may also decrease the opening degree of the first cooling flow path 154 or increase the opening degree of the heating flow path 151.

For example, the temperature of the temperature control liquid Lq in the first cooling flow path 154 upstream of a merging point 80 where the first cooling flow path 154 and the heating flow path 151 are merged together and the temperature of the temperature control liquid Lq in the heating flow path 151 upstream of the merging point 80 may be measured, and the opening degree of the first cooling flow path 154 and the heating flow path 151 may be adjusted according to each of the measured temperature. The temperature of the temperature control liquid Lq in a flow path 81 between the merging point 80 and the battery DB may be measured, and the opening degree of the first cooling flow path 154 and the heating flow path 151 may be adjusted according to the measured temperature.

According to the temperature control system 100*c* of the third embodiment described above, the control unit 300 controls the first adjustment valve and the second adjustment valve according to a measurement value of the temperature sensor 91 that measures the temperature of the battery DB. In this way, the flow rate of the cooled temperature control liquid Lq flowing through the cooling flow path 152*b* toward the battery DB and the flow rate of the temperature control liquid Lq flowing through the heating flow path 151 toward the battery DB may be adjusted according to the temperature of the battery DB. Therefore, the temperature of the battery DB may be more finely controlled.

In another embodiment, the second valve 62*b* may not function as the first adjustment valve. In this case, for example, the first adjustment valve may be provided in the first cooling flow path 154 downstream of the second valve 62*b* and upstream of the merging point 80. In another embodiment, the first valve 61*b* may not function as the second adjustment valve. In this case, for example, the second adjustment valve may be provided in the heating flow path 151 downstream of the first valve 61*b* and upstream of the merging point 80. The first valve 61*b* may be configured to adjust an opening degree of the flow path in the heater circuit 130, for example, an opening degree of the fifth flow path 32. The second valve 62*b* may be configured to adjust an opening degree of the second cooling flow path 155. The third valve 63 may be configured to be able to adjust an opening degree of a flow path in the cooling flow path 152 or the cooling circuit 110, for example, an opening degree of the first flow path 11. The fourth valve 74 may be configured to be able to adjust an opening degree of the first refrigerant flow path 71 and the second refrigerant flow path 72.

D. Other Embodiments (D1) In each of the embodiments described above, the second valve 62 is provided in the cooling flow path 152. Alternatively, the second valve 62 may not be provided. The cooling flow path 152 branches into the first cooling flow path 154 and the second cooling flow path 155 at the branch point 159. Alternatively, the cooling flow path 152 may not branch as such. In this case, in the cooling flow path 152, the battery DB may be cooled upstream of the charging unit CU, or may be cooled downstream of the charging unit CU.

(D2) In each of the embodiments described above, the cooling flow path 152 is connected to the cooling circuit 110. Alternatively, the cooling flow path 152 may not be connected to the cooling circuit 110. In this case, the cooling flow path 152 may be connected to a pump for supplying the temperature control liquid Lq from the reserve tank 101 to the cooling flow path 152, which is different from the pump 102. In this case, by controlling the pump by the control unit 300, a flow of the temperature control liquid Lq from the reserve tank 101 to the cooling flow path 152 may be regulated and allowed.

(D3) In each of the embodiments described above, the common pump 102 is provided for the cooling circuit 110 and the heater circuit 130, but the present disclosure is not limited thereto. For example, a pump for supplying the temperature control liquid Lq from the reserve tank 101 to the cooling circuit 110 and a pump for supplying the temperature control liquid Lq from the reserve tank 101 to the heater circuit 130 may be separately provided. The pump may or may not be fixed to the reserve tank 101.

(D4) In each of the embodiments described above, the cooling flow path 152 passes through the second cooling unit 160. Alternatively, the cooling flow path 152 may not pass through the second cooling unit 160. In this case, the temperature control liquid Lq cooled by the cooling circuit 110 may be supplied to the cooling flow path 152. In this case, the temperature control liquid Lq supplied to the cooling flow path 152 may be cooled by the first cooling unit 111 as described in the second embodiment, or may be cooled by a cooling unit different from the first cooling unit 111.

(D5) In each of the embodiments described above, the chiller 170 may supply the heat of the temperature control liquid Lq to the heater circuit 130, but the present disclosure is not limited thereto. In this case, for example, the chiller 170 may be configured to exchange heat between the refrigerant and a liquid different from the temperature control liquid Lq in the water-cooled condenser 173. The chiller 170 may include, for example, an air-cooled condenser instead of the water-cooled condenser 173.

The present disclosure is not limited to the above-described embodiments, and may be implemented by various configurations without departing from the gist of the present disclosure. For example, the technical features in the embodiments corresponding to the technical features in the aspects described in the summary of the invention may be replaced or combined as appropriate to solve a part or all of the above-described problems or to achieve a part or all of the above-described effects. The technical features may be appropriately deleted unless being described as necessary in the present specification.

What is claimed is:

1. A vehicle temperature control system used in an electric vehicle, the vehicle temperature control system comprising:
- a reserve tank configured to store a temperature control liquid;
- a cooling circuit configured to circulate the temperature control liquid in an order of the reserve tank, a first cooling unit configured to cool the temperature control liquid, and an object to be cooled provided in the electric vehicle;
- a heater circuit configured to circulate the temperature control liquid in an order of the reserve tank, a heater configured to heat the temperature control liquid, and an object to be heated provided in the electric vehicle;
- a temperature control circuit including
  - (i) a heating flow path connected to the heater circuit and configured to allow the temperature control liquid heated by the heater to flow from the reserve tank to a battery for driving provided in the electric vehicle,
  - (ii) a cooling flow path configured to allow the cooled temperature control liquid to flow from the reserve tank toward the battery and a charging unit configured to charge the battery, and
  - (iii) a recovery flow path configured to allow the temperature control liquid to flow from the heating flow path and the cooling flow path toward the reserve tank; and
- a first valve configured to open and close the heating flow path;
- wherein the cooling flow path branches at a branch point into a first cooling flow path configured to allow the temperature control liquid to flow toward the battery and a second cooling flow path configured to allow the temperature control liquid to flow toward the charging unit, and
- a second valve configured to open and close the second cooling flow path is further provided.

2. The vehicle temperature control system according to claim 1, further comprising:
- a third valve provided at a connection point between the cooling circuit and the cooling flow path, and configured to open and close the cooling circuit and the cooling flow path,
- wherein the cooling flow path is connected to a first portion of the cooling circuit, the first portion being located downstream of the first cooling unit and upstream of the object to be cooled.

3. A vehicle temperature control system used in an electric vehicle, the vehicle temperature control system comprising:
- a reserve tank configured to store a temperature control liquid;
- a cooling circuit configured to circulate the temperature control liquid in an order of the reserve tank, a first cooling unit configured to cool the temperature control liquid, and an object to be cooled provided in the electric vehicle;
- a heater circuit configured to circulate the temperature control liquid in an order of the reserve tank, a heater configured to heat the temperature control liquid, and an object to be heated provided in the electric vehicle;
- a temperature control circuit including
  - (i) a heating flow path connected to the heater circuit and configured to allow the temperature control liquid heated by the heater to flow from the reserve tank to a battery for driving provided in the electric vehicle,
  - (ii) a cooling flow path configured to allow the cooled temperature control liquid to flow from the reserve tank toward the battery and a charging unit configured to charge the battery, and
  - (iii) a recovery flow path configured to allow the temperature control liquid to flow from the heating flow path and the cooling flow path toward the reserve tank; and
- a first valve configured to open and close the heating flow path;
- wherein the cooling flow path passes through a second cooling unit configured to cool the temperature control liquid flowing through a second portion of the cooling flow path, the second portion being located upstream of the battery and the charging unit.

4. The vehicle temperature control system according to claim 3,
- wherein the second cooling unit includes a radiator and a chiller configured to cool the temperature control liquid.

5. The vehicle temperature control system according to claim 4,
- wherein the chiller is configured to supply heat of the temperature control liquid to the heater circuit.

6. A vehicle temperature control system used in an electric vehicle, the vehicle temperature control system comprising:
- a reserve tank configured to store a temperature control liquid;
- a cooling circuit configured to circulate the temperature control liquid in an order of the reserve tank, a first cooling unit configured to cool the temperature control liquid, and an object to be cooled provided in the electric vehicle;
- a heater circuit configured to circulate the temperature control liquid in an order of the reserve tank, a heater configured to heat the temperature control liquid, and an object to be heated provided in the electric vehicle;
- a temperature control circuit including
  - (i) a heating flow path connected to the heater circuit and configured to allow the temperature control liquid heated by the heater to flow from the reserve tank to a battery for driving provided in the electric vehicle,
  - (ii) a cooling flow path configured to allow the cooled temperature control liquid to flow from the reserve tank toward the battery and a charging unit configured to charge the battery, and (iii) a recovery flow path configured to allow the temperature control liquid to flow from the heating flow path and the cooling flow path toward the reserve tank; and a first valve configured to open and close the heating flow path;

wherein the cooling flow path is provided with a first adjustment valve configured to adjust a flow rate of the cooled temperature control liquid flowing through the cooling flow path from the reserve tank toward the battery, wherein the first valve is configured to adjust a flow rate of the temperature control liquid flowing through the heating flow path from the heater circuit toward the battery, wherein the vehicle temperature control system further includes a temperature sensor configured to measure a temperature of the battery, and a control unit configured to control the first adjustment valve and the second adjustment valve, and wherein the control unit controls the first adjustment valve and the second adjustment valve according to a measurement value of the temperature sensor.

7. The vehicle temperature control system according to claim 1, wherein the object to be cooled includes at least one of a motor and an inverter that are supplied with electric power from the battery and are used to drive the electric vehicle, and wherein the object to be heated includes a heater core used to heat a vehicle interior of the electric vehicle.

8. The vehicle temperature control system according to claim 2, wherein the object to be cooled includes at least one of a motor and an inverter that are supplied with electric power from the battery and are used to drive the electric vehicle, and wherein the object to be heated includes a heater core used to heat a vehicle interior of the electric vehicle.

9. The vehicle temperature control system according to claim 3, wherein the object to be cooled includes at least one of a motor and an inverter that are supplied with electric power from the battery and are used to drive the electric vehicle, and wherein the object to be heated includes a heater core used to heat a vehicle interior of the electric vehicle.

10. The vehicle temperature control system according to claim 4, wherein the object to be cooled includes at least one of a motor and an inverter that are supplied with electric power from the battery and are used to drive the electric vehicle, and wherein the object to be heated includes a heater core used to heat a vehicle interior of the electric vehicle.

11. The vehicle temperature control system according to claim 5, wherein the object to be cooled includes at least one of a motor and an inverter that are supplied with electric power from the battery and are used to drive the electric vehicle, and wherein the object to be heated includes a heater core used to heat a vehicle interior of the electric vehicle.

12. The vehicle temperature control system according to claim 6, wherein the object to be cooled includes at least one of a motor and an inverter that are supplied with electric power from the battery and are used to drive the electric vehicle, and wherein the object to be heated includes a heater core used to heat a vehicle interior of the electric vehicle.

* * * * *